United States Patent
Ota et al.

(10) Patent No.: US 8,319,750 B2
(45) Date of Patent: Nov. 27, 2012

(54) SENSING CIRCUIT, METHOD OF DRIVING SENSING CIRCUIT, DISPLAY DEVICE, METHOD OF DRIVING DISPLAY DEVICE, AND ELECTRONIC APPARATUS

(75) Inventors: Hitoshi Ota, Shiojiri (JP); Eiji Kanda, Suwa (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 12/427,506

(22) Filed: Apr. 21, 2009

(65) Prior Publication Data
US 2009/0273580 A1    Nov. 5, 2009

(30) Foreign Application Priority Data

May 2, 2008    (JP) .................................. 2008-120235
May 16, 2008    (JP) .................................. 2008-129070

(51) Int. Cl.
*G06F 3/042*    (2006.01)

(52) U.S. Cl. ..................................... 345/175; 178/18.06

(58) Field of Classification Search .................. 345/173, 345/175, 183, 204, 207; 178/18.01, 18.06, 178/18.07, 19.03, 19.05; 250/214 R; 356/218
See application file for complete search history.

(56) References Cited

U.S. PATENT DOCUMENTS

| | | | |
|---|---|---|---|
| 7,868,882 B2* | 1/2011 | Kobashi | 345/207 |
| 2005/0218302 A1* | 10/2005 | Shin et al. | 250/214 R |

FOREIGN PATENT DOCUMENTS

| | | |
|---|---|---|
| JP | A-2004-119494 | 4/2004 |
| JP | A-2005-72126 | 3/2005 |
| JP | A-2006-40289 | 2/2006 |
| JP | A-2006-189868 | 7/2006 |
| JP | A-2007-41602 | 2/2007 |
| JP | A-2007-47851 | 2/2007 |
| JP | A-2007-48275 | 2/2007 |
| JP | A-2007-122733 | 5/2007 |
| JP | A-2008-27292 | 2/2008 |

* cited by examiner

*Primary Examiner* — Abbas Abdulselam
(74) *Attorney, Agent, or Firm* — K&L Gates LLP

(57) ABSTRACT

A display device includes: a first substrate and a second substrate that face each other; electro-optical elements that are interposed between the first substrate and the second substrate; light detecting units that are provided between the first substrate and the second substrate and output first detection signals having levels corresponding to the amount of incident light; and capacitance detecting units that include capacitive elements each having a first electrode and a second electrode provided between the first substrate and the second substrate, output second detection signals having levels corresponding to the capacitance values of the capacitive elements, and are provided separately from the light detecting units.

17 Claims, 19 Drawing Sheets

⟨ Tres: RESET PERIOD ⟩

⟨ Texp: EXPOSURE PERIOD ⟩

⟨ Tout: READ PERIOD ⟩

⟨ Tres: RESET PERIOD ⟩

⟨ Tsen: SENSING PERIOD ⟩

⟨ Tout: READ PERIOD ⟩

SENSING CIRCUIT, METHOD OF DRIVING SENSING CIRCUIT, DISPLAY DEVICE, METHOD OF DRIVING DISPLAY DEVICE, AND ELECTRONIC APPARATUS

BACKGROUND

1. Technical Field

The present invention relates to a technique for detecting contact.

2. Related Art

Display devices having a function of detecting the contact between an object, such as a finger or a pen, and a screen have been known. For example, JP-A-2007-47851, JP-A-2006-40289, and JP-A-2006-189868 disclose a first technique that detects a variation in the capacitance of a capacitive element including two electrodes opposite to each other and an electro-optical material, such as liquid crystal, interposed between the two electrodes to detect the contact between an object and a screen. In addition, for example, JP-A-2005-72126, JP-A-2004-119494, and JP-A-2008-27292 disclose a second technique that detects a variation in the amount of light incident on an optical sensor to detect the contact between an object and a screen.

In the first technique, capacitance detecting units each including the capacitive element including two electrodes opposite to each other and an electro-optical material interposed between the two electrodes are provided in a display device. One of the electrodes is provided on a surface of a first substrate facing a second substrate, and the other electrode is provided on a surface of the second substrate facing the first substrate. In this structure, it is considered that a plurality of capacitance detecting units are provided in the display device in order to detect a contact position between the object and the display device. When the object contacts the display device, the substrate is curved, and a gap between the electrodes varies. The capacitance detecting unit disposed closest to the contact point detects a variation in capacitance corresponding to the variation in the gap between the electrodes and detects the contact of the object. However, the curving of the substrate causes other capacitance detecting units to detect the contact of the object. As a result, an excessively large area is likely to be specified as the contact position between the object and the display device. That is, it is difficult to accurately detect the contact position of the object.

In the second technique, the optical sensor is provided in the display device. In this structure, for example, when an object, such as a finger, with a shadow approaches the screen, the amount of light incident on the optical sensor is changed by the shaded area even though the object does not contact the screen. As a result, it may be determined that the object contacts the screen, which is a detection error. Therefore, it is difficult to accurately determine whether the object contacts or approaches the screen. That is, there is a concern that the contact position of the object will be erroneously specified.

SUMMARY

An advantage of some aspects of the invention is that it provides a technique capable of accurately detecting contact between an object and a display device and specifying a contact position therebetween with high accuracy.

According to a first aspect of the invention, a display device includes: a first substrate and a second substrate that face each other; electro-optical elements (for example, liquid crystal elements 50 shown in FIG. 1) that are interposed between the first substrate and the second substrate; light detecting units that are provided between the first substrate and the second substrate and output first detection signals having levels corresponding to the amount of incident light; and capacitance detecting units that include capacitive elements (for example, capacitive elements C shown in FIG. 2, and capacitive elements C2 shown in FIG. 4) each having a first electrode (for example, an electrode 121 shown in FIGS. 2 to 4) and a second electrode (for example, an opposite electrode 55 shown in FIGS. 2 to 4) provided between the first substrate and the second substrate, output second detection signals having levels corresponding to the capacitance values of the capacitive elements, and are provided separately from the light detecting units. According to the display device of the first aspect, it is possible to accurately detect the contact between an object and the display device.

In the display device according to the first aspect, each of the capacitive elements may include the first electrode (for example, the electrode 121 shown in FIG. 2) provided on a surface of the first substrate facing the second substrate, the second electrode (for example, the opposite electrode 55 shown in FIG. 2) provided on a surface of the second substrate facing the first substrate, and an electro-optical material (for example, liquid crystal 57 shown in FIG. 2) interposed between the first electrode and the second electrode. Each of the second electrodes may be provided on the surface of the second substrate facing the first substrate so as to cover a first protruding portion (for example, a protruding portion 140b shown in FIG. 2) that protrudes toward the first substrate. According to this structure, since the second electrode is provided on the surface of the second substrate facing the first substrate so as to cover the first protruding portion that protrudes toward the first substrate, it is possible to reduce the gap between the first electrode and the second electrode, as compared to a structure in which the first protruding portion is not provided. Therefore, it is possible to increase the capacitance value of the capacitive element. As a result, it is possible to detect a variation in the capacitance value of the capacitive element with high sensitivity.

In the display device according to the first aspect, the first electrodes (for example, the electrodes 121 shown in FIG. 4) and the second electrodes (for example, the opposite electrodes 55 shown in FIG. 4) may be provided on the first substrate. Each of the capacitive elements may include the first electrode, the second electrode, and an electro-optical material provided between the first and second electrodes and the second substrate. First protruding portions (for example, the protruding portions 140b shown in FIG. 4) that protrude toward the first substrate may be provided on a surface of the second substrate facing the first substrate such that each of the first protruding portions faces at least a portion of the first electrode and the second electrode. According to this structure, the electro-optical material is likely to be disarrayed by the first protruding portions, and the capacitance value of the capacitive element varies greatly, as compared to a structure in which the first protruding portion is not provided. Therefore, it is possible to sufficiently ensure a variation in the capacitance value during contact and non-contact. That is, it is possible to improve detection sensitivity.

The display device according to the first aspect may further include spacers (for example, spacers 200 shown in FIG. 2) each of which includes a second protruding portion (for example, a dummy photodiode 130 shown in FIG. 2) that is provided at a different position from the light detecting unit and the capacitance detecting unit on the surface of the first substrate facing the second substrate and protrudes toward the second substrate and a third protruding portion (for example, a protruding portion 140a shown in FIG. 2) that is provided at a position facing the second protruding portion on the surface of the second substrate facing the first substrate and protrudes toward the first substrate. The second protruding portion and the third protruding portion may come into contact with each other to form the spacer (for example, which includes a structure in which they come into contact with each other with alignment films 90*a* and 90*b* interposed therebetween, as shown in FIG. 2). The first protruding portion and the third protruding portion may have the same height. According to this structure, since the first protruding portion and the third protruding portion have the same height, it is not necessary to provide a protruding portion having a different height on the surface of the second substrate facing the first substrate. Therefore, it is easy to manufacture a display device.

In the display device according to the first aspect, the light detecting unit may include a light detecting element (for example, a photodiode PD shown in FIG. 2) that is provided on the surface of the first substrate facing the second substrate, and the second protruding portion may include a second light detecting element (for example, the dummy photodiode 130 shown in FIG. 2) having the same structure as the light detecting element. According to this structure, since the second protruding portion includes the second light detecting element having the same structure as the light detecting element included in the light detecting unit, it is possible to simultaneously manufacture the second protruding portion and the light detecting element included in the light detecting unit by the same manufacturing process. Therefore, it is easy to manufacture a display device.

The display device according to the first aspect may further include second spacers (for example, spacers 201 shown in FIG. 3). The light detecting unit may include a light detecting element that is provided on the surface of the first substrate facing the second substrate. Each of the second spacers may include the light detecting element and a fourth protruding portion (for example, a protruding portion 140*c* shown in FIG. 3) that is provided at a position facing the light detecting element on the surface of the second substrate facing the first substrate so as to protrude toward the first substrate. The light detecting element and the fourth protruding portion may come into contact with each other to form the second spacer (for example, which includes a structure in which they come into contact with each other with the alignment films 90*a* and 90*b* interposed therebetween, as shown in FIG. 3). The fourth protruding portion and the first protruding portion may have the same height. Specifically, the fourth protruding portion may be made of a translucent material (for example, a transparent acrylic resin). According to this structure, since the second spacer that regulates the gap between the first substrate and the second substrate includes the light detecting element and the fourth protruding portion, it is not necessary to provide a spacer for maintaining the gap between the first substrate and the second substrate at a different position from the light detecting element on the first substrate. In addition, it is not necessary to provide a spacer for maintaining the gap between the first substrate and the second substrate at a different position from the fourth protruding portion on the second substrate. Therefore, it is possible to simplify the structure of a display device.

The display device according to the first aspect may further include a detecting circuit that detects contact between an object and the display device on the basis of the first detection signal and the second detection signal. Specifically, when both the first detection signal and the second detection signal are valid, the detecting circuit outputs a contact detection signal indicating that an object contacts the display device. The signal output from the detecting circuit is a logical product of the first detection signal and the second detection signal. When both the first detection signal and the second detection signal are valid, the detecting circuit outputs the contact detection signal. On the other hand, when one of the first detection signal and the second detection signal is not valid, the detecting circuit does not output the contact detection signal. According to this structure, it is possible to accurately detect the contact between an object and the display device. In addition, it is possible to accurately detect a contact position therebetween.

In the above-mentioned aspect, preferably, the display device further includes the detecting circuit that detects contact between an object and the display device on the basis of the first detection signal and the second detection signal. Specifically, when both the first detection signal and the second detection signal are valid, the detecting circuit outputs a contact detection signal indicating that an object contacts the display device. The signal output from the detecting circuit is a logical product of the first detection signal and the second detection signal. When both the first detection signal and the second detection signal are valid, the detecting circuit outputs the contact detection signal. On the other hand, when one of the first detection signal and the second detection signal is not valid, the detecting circuit does not output the contact detection signal. According to this structure, it is possible to accurately detect the contact between an object and the display device. In addition, it is possible to accurately detect the contact position therebetween.

According to a second aspect of the invention, a sensing circuit includes: a first substrate and a second substrate that face each other; a dielectric material (for example, a dielectric material PM shown in FIG. 11, and liquid crystal 498 shown in FIG. 22) that is interposed between the first substrate and the second substrate; a plurality of scanning lines (for example, measuring scanning lines 302 shown in FIG. 5) that extend along the first substrate or the second substrate between the first substrate and the second substrate; a plurality of capacitance sensing circuits (for example, capacitance sensing circuits 350 shown in FIG. 5, and capacitance sensing circuits 490 shown in FIG. 22) and a plurality of light sensing circuits (for example, light sensing circuits 340 shown in FIG. 5, and light sensing circuits 480 shown in FIG. 21) that are arranged in a matrix along the first substrate or the second substrate between the first substrate and the second substrate. The light sensing circuits are connected to the scanning lines to which the plurality of capacitance sensing circuits are not connected, and output light measurement signals having levels corresponding to the amount of incident light. The capacitance sensing circuits are connected to the scanning lines to which the plurality of light sensing circuits are not connected, include capacitive elements (for example, contact measuring capacitive elements 351 shown in FIG. 11, and contact measuring capacitive elements 495 shown in FIG. 22) each having the dielectric material, a first electrode (for example, a first electrode 356 shown in FIG. 11 and a first electrode 496 shown in FIG. 22), and a second electrode (for example, a second electrode 357 shown in FIG. 11, and a second electrode 497 shown in FIG. 22), and output capacitance measurement signals having levels corresponding to the capacitance values of the capacitive elements.

According to the sensing circuit of the second aspect, it is possible to accurately specify the contact position between an object and a display device on the basis of the light measurement signal output from the light sensing circuit and the capacitance measurement signal output from the capacitance sensing circuit. In addition, only the light sensing circuits or only the capacitance sensing circuits are selected by the selection of one scanning line (the selection of a row), and the circuits selected by one row selecting operation output only the light measurement signals or the capacitance measurement signals. Therefore, it is possible to simplify the data processing of a circuit in the next stage.

The sensing circuit according to the second aspect may further include a plurality of sensing lines (for example, sensing lines 303 shown in FIG. 5) that extend along the first substrate or the second substrate between the first substrate and the second substrate. The capacitance sensing circuits and the light sensing circuits may be connected to the sensing lines. According to this structure, since the sensing lines are common to the capacitance sensing circuits and the light sensing circuits, it is possible to improve, for example, the aperture ratio of the light sensing circuit.

In the sensing circuit according to the second aspect, the number of light sensing circuits may be larger than that of capacitance sensing circuits. According to this structure, it is possible to improve the resolution of the specification of a contact position, as compared to a structure in which the number of light sensing circuits is equal to or less than that of capacitance sensing circuits. Alternatively, the sensing circuit may further include: a shift register for light (for example, a shift register 312 for light shown in FIG. 5) to which the scanning lines connected to the plurality of light sensing circuits are connected; and a shift register for capacitance (for example, a shift register 311 for capacitance shown in FIG. 5) to which the scanning lines connected to the plurality of capacitance sensing circuits are connected. The number of stages of the shift register for capacitance may be smaller than that of the shift register for light. For example, there may be provided a method of specifying a contact position in a sensing circuit including a plurality of capacitance sensing circuits that measure a variation in capacitance and output capacitance measurement signals and a plurality of light sensing circuits that measure the amount of incident light and output light measurement signals, the method including: a first step of sequentially scanning the plurality of capacitance sensing circuits to acquire the capacitance measurement signals; a second step of determining whether an object contacts a contact surface on the basis of the acquired capacitance measurement signals, a third step of sequentially scanning the plurality of light sensing circuits to acquire the light measurement signals after it is determined in the second step that the object contacts the contact surface, and a fourth step of specifying the contact position of the object with the contact surface on the basis of the acquired light measurement signals. The first step and the second step are repeatedly performed until it is determined in the second step that the object contacts the contact surface. In the abovementioned method, when the number of stages of the shift register for capacitance is smaller than that of the shift register for light, it is possible to reduce power consumption when the first step of controlling the shift register for capacitance to acquire the capacitance measurement signal and the second step of determining whether the object contacts the contact surface are repeatedly performed in an electronic apparatus (for example, a display device) provided with the sensing circuit.

According to a third aspect of the invention, a display device includes: the above-mentioned sensing circuit; and a plurality of pixel circuits (for example, pixel circuits 460 shown in FIGS. 21 and 22) that are arranged in a matrix along the first substrate or the second substrate between the first substrate and the second substrate. Each of the pixel circuits includes the dielectric material, and the dielectric material is liquid crystal.

According to a fourth aspect of the invention, there is provided a method of driving a sensing circuit. The method includes: driving a plurality of capacitance sensing circuits; driving a plurality of light sensing circuits; and alternately performing the driving of the capacitance sensing circuits and the driving of the light sensing circuits. According to the driving method, an image based on only the light measurement signals output from all of the plurality of light sensing circuit and an image based on only the capacitance measurement signals output from all of the plurality of capacitance sensing circuits are obtained for each frame. Therefore, it is possible to simplify the data processing of a circuit in the next stage.

According to a fifth aspect of the invention, there is provided a method of driving a display device. The method includes: driving a plurality of pixel circuits and a plurality of capacitance sensing circuits; driving the plurality of pixel circuits and a plurality of light sensing circuits; and alternately performing the driving of the pixel circuits and the capacitance sensing circuits and the driving of the pixel circuits and the light sensing circuits. According to this driving method, an image based on only the light measurement signals output from all of the plurality of light sensing circuits and an image based on only the capacitance measurement signals output from all of the plurality of capacitance sensing circuits are obtained for each frame. Therefore, it is possible to simplify the data processing of a circuit in the next stage.

The optical characteristics, such as transmittance or brightness, of the electro-optical material according to the above-mentioned aspects vary depending on electric energy supplied, such as a current or a voltage. A typical example of the electro-optical material is liquid crystal. In addition, the sensing circuit or the display device according to the above-mentioned aspects is used for an electronic apparatus. A typical example of the electronic apparatus is a personal computer or a mobile telephone.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
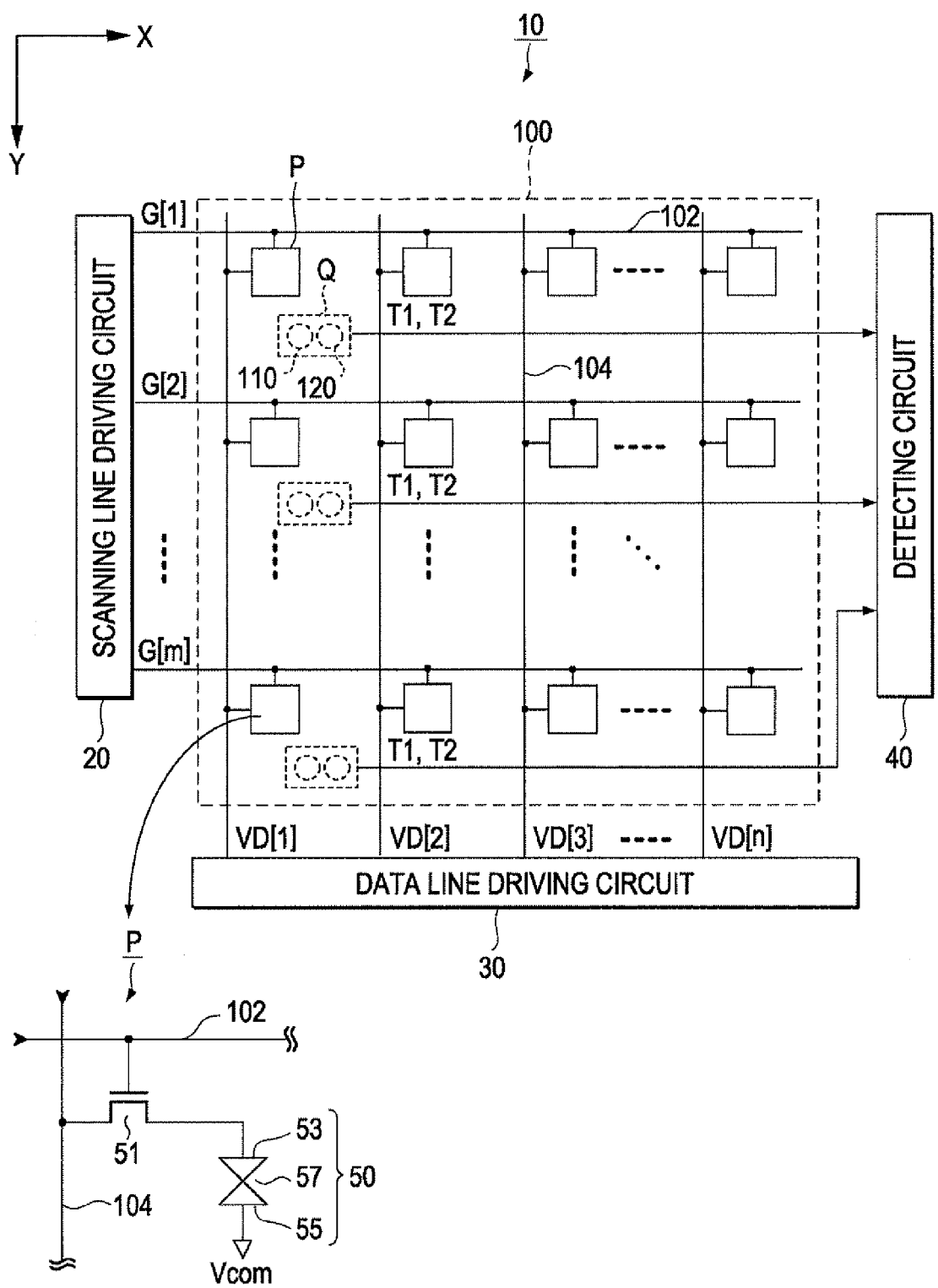
FIG. 1 is a block diagram illustrating a display device according to a first embodiment of the invention.

Hereinafter, exemplary embodiments of the invention will be described with reference to the accompanying drawings. However, a description of a known technique used in a general liquid crystal display device, such as a structure using a color filter, will be appropriately omitted. In the following description, for example, the dimensions, dimension ratios, and shapes of components shown in the drawings are not necessarily identical to actual dimensions, dimension ratios, and shapes. In addition, in the following description, components having the same reference numerals have the same operations or functions as long as their operations or functions are not particularly described.

First Embodiment

FIG. 1 is a block diagram illustrating the structure of a display device 10 according to a first embodiment of the invention. The display device 10 includes a pixel region 100 in which a plurality of pixel circuits P are arranged in a matrix, a scanning line driving circuit 20 and a data line driving circuit 30 that drive each of the pixel circuits P, and a detecting circuit 40 that detects the contact between an object and the display device 10. As shown in FIG. 1, the pixel region 100 includes m scanning lines 102 that extend in an X direction and n data lines 104 that extend in a Y direction orthogonal to the X direction (m and n are natural numbers that are equal to or greater than 2). The pixel circuits P are arranged at positions corresponding to intersections of the scanning lines 102 and the data lines 104. Therefore, the pixel circuits P are arranged in a matrix of m rows by n columns. In addition, a backlight (not shown) is provided on the rear side of the pixel region 100.

The scanning line driving circuit 20 sequentially activates scanning signals Gi (i=1 to m) output to each of the m scanning lines 102 for each horizontal scanning period to sequentially select the scanning lines 102. The data line driving circuit 30 generates data potentials VD[1] to VD[n] corresponding to a row of n pixel circuits P corresponding to one scanning line 102 selected by the scanning line driving circuit 20 and outputs the data potentials to each of the data lines 104. A data potential VD[j] output to a j-th (j is an integer satisfying $1 \leq j \leq n$) data line 104 when an i-th scanning line is selected corresponds to a grayscale level designated to the pixel circuit P disposed at the intersection between the i-th scanning line and the j-th data line, As shown in FIG. 1, the pixel circuit P includes a liquid crystal element 50 and a transistor 51. The liquid crystal element 50 includes a pixel electrode 53 and an opposite electrode 55 that are opposite to each other with a gap therebetween, and liquid crystal 57 interposed between the pixel electrode 53 and the opposite electrode 55. A common potential Vcom is supplied to the opposite electrode 55. The transistor 51 is an N-channel TFT (thin film transistor), and is provided between the pixel electrode 53 and the data line 104 to control electrical connection therebetween. A gate of the transistor 51 is connected to the scanning line 102. Therefore, when an i-th scanning line 102 is selected, the transistors 51 of the pixel circuits P in the i-th scanning line are turned on, and a data potential VD is supplied from the data line 104 to the pixel electrodes 53 of the pixel circuits P. Then, a voltage (=VD−Vcom) is applied to the liquid crystal element 50 of each of the pixel circuits P. The transmittance of the liquid crystal element 50 in each of the pixel circuits P (the ratio of the amount of light transmitted to an observer side to the amount of light emitted from the backlight to the liquid crystal element 50) depends on the data potential VD supplied to the pixel circuit P.

As shown in FIG. 1, a plurality of contact detecting units Q are provided in the pixel region 100. Each of the plurality of contact detecting units Q is arranged in a predetermined position so as not to overlap the pixel circuit P, and outputs a first detection signal T1 and a second detection signal T2 to the detecting circuit 40. Each of the plurality of contact detecting units Q includes a light detecting unit 110 that outputs the first detection signal Ti and a capacitance detecting unit 120 that outputs the second detection signal T2. The detecting circuit 40 detects a contact position between an object and the display device 10 on the basis of the first detection signal T1 and the second detection signal T2 output from each of the contact detecting units Q, which will be described below.

Figure 2:
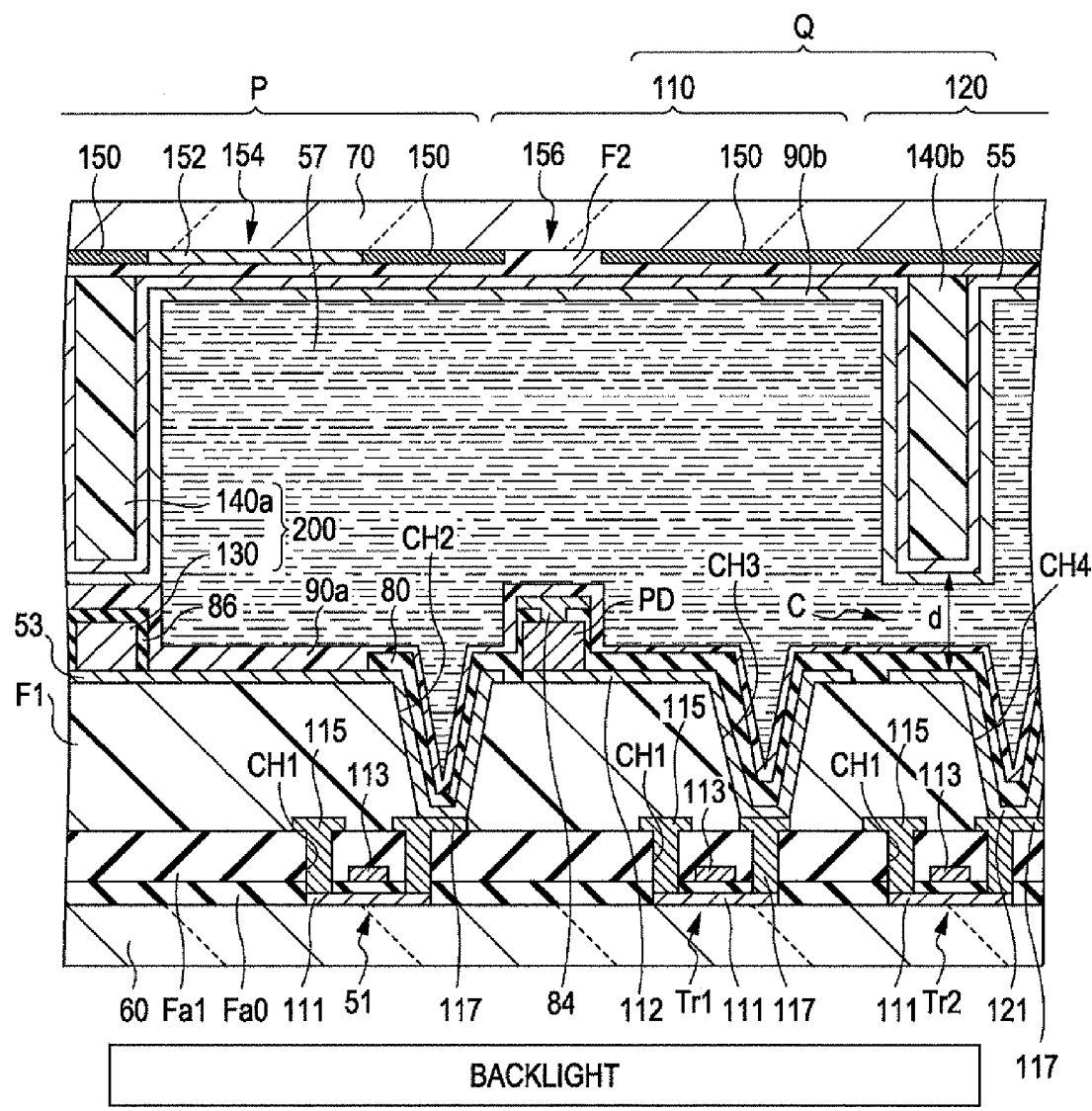
FIG. 2 is a cross-sectional view illustrating the display device according to the first embodiment of the invention.

FIG. 2 is a cross-sectional view illustrating the pixel region 100. As shown in FIG. 2, the liquid crystal 57 is interposed between a first substrate 60 and a second substrate 70 that face each other. The first substrate 60 and the second substrate 70 are formed of a translucent material, such as glass. The light detecting units 110 and the capacitance detecting units 120 are provided between the first substrate 60 and the second substrate 70. The light detecting unit 110 includes a photodiode PD, and outputs the first detection signal T1 corresponding to the amount of light incident on the photodiode PD. The capacitance detecting unit 120 outputs the second detection signal T2 corresponding to a variation in the gap between the first substrate 60 and the second substrate 70. Light incident on the first substrate 60 from the backlight passes through the liquid crystal 57 and the second substrate 70 and is then emitted to the observer side.

As shown in FIG. 2, the transistors 51 included in the pixel circuits P, transistors Tr1 included in the light detecting units 110, and transistors Tr2 included in the capacitance detecting units 120 are formed on a surface of the first substrate 60 that faces the second substrate 70.

Each of the transistors (51, Tr1, and Tr2) includes a semiconductor layer 111 that is made of a semiconductor material and is formed on the surface of the first substrate 60 facing the second substrate 70 and a gate electrode 113 that is opposite to the semiconductor layer 111 with a gate insulating layer Fa0 covering the semiconductor layer 111 interposed therebetween. The gate electrode 113 is covered with a first insulating layer Fa1. A drain electrode 115 and a source electrode 117 of each of the transistors (51, Tr1, and Tr2) are formed on the first insulating layer Fa1 and are electrically connected to the semiconductor layer 111 through contact holes CH1. The drain electrode 115 and the source electrode 117 of each of the transistors (51, Tr1, and Tr2) are covered with a first planarizing layer F1. The first planarizing layer F1 is made of a translucent material, such as a transparent acrylic resin.

As shown in FIG. 2, pixel electrodes 53, electrodes 112, and electrodes 121 are formed on the first planarizing layer F1 so as to be separated from one another. The pixel electrodes 53 are formed in the plurality of pixel circuits P so as to be separated from each other, and are made of a translucent conductive material, such as ITO (indium tin oxide) or IZO (indium zinc oxide). Each of the pixel electrodes 53 is electrically connected to the source electrode 117 of the transistor 51 through a contact hole CH2 that passes through the first planarizing layer F1. The electrodes 112 are formed in the light detecting units 110 of the plurality of contact detecting units Q so as to be separated from each other, and are electrically connected to the source electrodes 117 of the transistors Tr1 through contact holes CH3. The electrodes 121 are formed in the capacitance detecting units 120 of the plurality of contact detecting units Q so as to be separated from each other, and are electrically connected to the source electrodes 117 of the transistors Tr2 through contact holes CH4.

As shown in FIG. 2, the photodiode PD is provided on a surface of the electrode 112 that faces the second substrate 70. The photodiode PD is covered with an insulating film 80 that is formed on the surface of the electrode 112 facing the second substrate 70. As shown in FIG. 2, an electrode 84 is provided on the insulating film 80 that covers the photodiode PD. The electrode 84 is connected to the upper surface of the photodiode PD through a contact hole. In addition, the electrode 112 and the pixel electrode 53 are electrically insulated from each other by the insulating film 80. The electrode 112 and the electrode 121 are electrically insulated from each other by the insulating film 80.

As shown in FIG. 2, a dummy photodiode 130 having the same material and structure as those of the photodiode PD is provided on a surface of the pixel electrode 53 that faces the second substrate 70. The dummy photodiode 130 is covered with the insulating film 86. In this embodiment, the dummy photodiode 130 does not function as a light detecting element, but maintains a constant distance between the first substrate 60 and the second substrate 70. Similar to the photodiode PD, the electrode 84 may be provided on the upper surface of the dummy photodiode 130.

As shown in FIG. 2, the electrode 121 is covered with the insulating film 80. As shown in FIG. 2, the insulating film 80, the electrodes 84, the pixel electrodes 53, and the insulating film 86 are covered with an alignment film 90a that aligns liquid crystal molecules in a predetermined direction. The alignment film 90a is made of, for example, polyimide resin.

As shown in FIG. 2, a light-shielding film 150 and a color filter 152 are provided on a surface of the second substrate 70 that faces the first substrate 60. The light-shielding film 150 includes openings 154 formed to correspond to the pixel circuits P. The color filter 152 is formed in each of the openings 154. As shown in FIG. 2, the light-shielding film 150 includes portions that face the dummy photodiodes 130. Therefore, light incident from the second substrate 70 to the dummy photodiode 130 is shielded.

As shown in FIG. 2, a transmission hole 156 through which light incident from the second substrate 70 toward the first substrate 60 is guided to the photodiode PD is formed in a region of the light-shielding film 150 that faces the photodiode PD. When an object approaches or contacts the display device 10 and a portion of or the entire transmission hole 156 is covered with the object, the amount of light incident on the photodiode PD through the transmission hole 156 varies. The light detecting unit 110 generates the first detection signal T1 having a level corresponding to the amount of light incident on the photodiode PD and outputs the signal to the detecting circuit 40. The first detection signal T1 is output to the detecting circuit 40 through the transistor Tr1.

As shown in FIG. 2, the light-shielding film 150 and the color filters 152 are covered with a second planarizing layer F2. The second planarizing layer F2 is made of a translucent material, such as a transparent acrylic resin. Protruding portions 140a and 140b that protrude toward the first substrate 60 are formed on a surface of the second planarizing layer F2 facing the first substrate 60. In this embodiment, the protruding portion 140a and the protruding portion 140b have the same height. The opposite electrode 55 continuously covers the entire surface of the second planarizing layer F2 on which the protruding portions 140a and 140b are formed. The opposite electrode 55 is made of a translucent conductive material, such as ITO (indium tin oxide). The opposite electrode 55 is covered with an alignment film 90b.

As shown in FIG. 2, the top surface of the protruding portion 140a (one end of the protruding portion 140a that protrudes toward the first substrate 60) and the top surface of the dummy photodiode 130 (one end of the dummy photodiode 130 that protrudes to the second substrate 70) are contacted with each other by the insulating film 86, the alignment films 90a and 90b, and the opposite electrode 55. That is, in this embodiment, a spacer 200 defining the gap between the first substrate 60 and the second substrate 70 includes the protruding portion 140a and the dummy photodiode 130 contacted with each other.

As shown in FIG. 2, the capacitance detecting unit 120 includes a capacitive element C having a portion of the opposite electrode 55 covering the protruding portion 140b, the electrode 121, and the liquid crystal 57 interposed therebetween. When an object contacts the second substrate 70 on the observer side and the second substrate 70 is curved, a gap d between the portion of the opposite electrode 55 covering the protruding portion 140b and the electrode 121 varies. Then, the capacitance value of the capacitive element C varies. The capacitance detecting unit 120 generates the second detection signal T2 having a level corresponding to the capacitance value of the capacitive element C and outputs the signal to the detecting circuit 40. The second detection signal T2 is output to the detecting circuit 40 through the transistor Tr2.

In this embodiment, since the opposite electrode 55 forming the capacitive element C is formed so as to cover the protruding portion 140b, it is possible to reduce the gap d, as compared to a structure in which the protruding portion 140b is not provided (that is, a structure in which the opposite electrode 55 forming the capacitive element C is provided on a surface of the second planarizing layer F2 facing the first substrate 60). Therefore, according to this embodiment, it is possible to increase the capacitance value of the capacitive element C. As a result, it is possible to detect a variation in the capacitance value with high sensitivity.

As described above, in the display device 10 according to this embodiment, the light detecting units 110 and the capacitance detecting units 120 are provided between the first substrate 60 and the second substrate 70. The light detecting unit 110 outputs the first detection signal T1 having a level corresponding to the amount of light incident on the photodiode PD to the detecting circuit 40, and the capacitance detecting unit 120 outputs the second detection signal T2 having a level corresponding to the capacitance value of the capacitive element C to the detecting circuit 40. The detecting circuit 40 detects the contact between an object and the display device 10 on the basis of the first detection signal T1 and the second detection signal T2. Specifically, when the amount of light incident on the photodiode PD of one of the plurality of contact detecting units Q provided in the pixel region 100 indicates that an object contacts or approaches the display device 10 and the capacitance value of the capacitive element C indicates that an object contacts the display device 10, the detecting circuit 40 outputs a contact detection signal indicating that the object has contacted a portion corresponding to the contact detecting unit Q to a control circuit (not shown).

However, when the object contacts the display device 10, the substrate is curved over a wider range than the actual contact portion between the object and the display device 10. Therefore, in a structure in which only the plurality of capacitance detecting units 120 are provided between the first substrate 60 and the second substrate 70, there is a concern that the capacitance detecting unit 120 disposed closest to the contact point as well as other capacitance detecting units detect the contact of the object. Therefore, it is difficult to accurately detect the contact position of the object. In addition, in a structure in which only the light detecting units 110 are provided between the first substrate 60 and the second substrate 70, when an object with a shadow approaches the display device 10, the amount of light incident on the photodiode PD corresponding to a shaded region of the display device 10 varies although the object does not contact the display device 10, and it may be determined that the object contacts the display device 10. Therefore, it is difficult to accurately determine whether an object contacts or approaches the display device 10.

In contrast, in this embodiment, when only one of the first detection signal T1 and the second detection signal T2 respectively output from the light detecting unit 110 and the capacitance detecting unit 120 has a level indicating that an object contacts the display device 10, it is not determined that the object contacts the display device 10. Only when the two signals have a level indicating that an object contacts the display device 10, it is determined that the object contacts the display device 10. Therefore, it is possible to accurately detect the contact between an object and the display device 10 and also accurately detect a contact position therebetween.

Further, in this embodiment, since the protruding portion 140a and the protruding portion 140b have the same height, it is not necessary to provide a protruding portion with a different height on the surface of the second substrate 70 facing the first substrate 60. Therefore, it is possible to easily manufacture the display device 10. In addition, in this embodiment, since the protruding portion 140a and the protruding portion 140b are made of the same material, it is possible to simultaneously manufacture them in the same manufacturing process.

Furthermore, in this embodiment, since the photodiode PD included in the light detecting unit 110 and the dummy photodiode 130 are made of the same material and have the same structure, it is possible to simultaneously manufacture the photodiode PD and the dummy photodiode 130 in the same manufacturing process. Therefore, it is possible to easily manufacture the display device 10.

Second Embodiment

Figure 3:
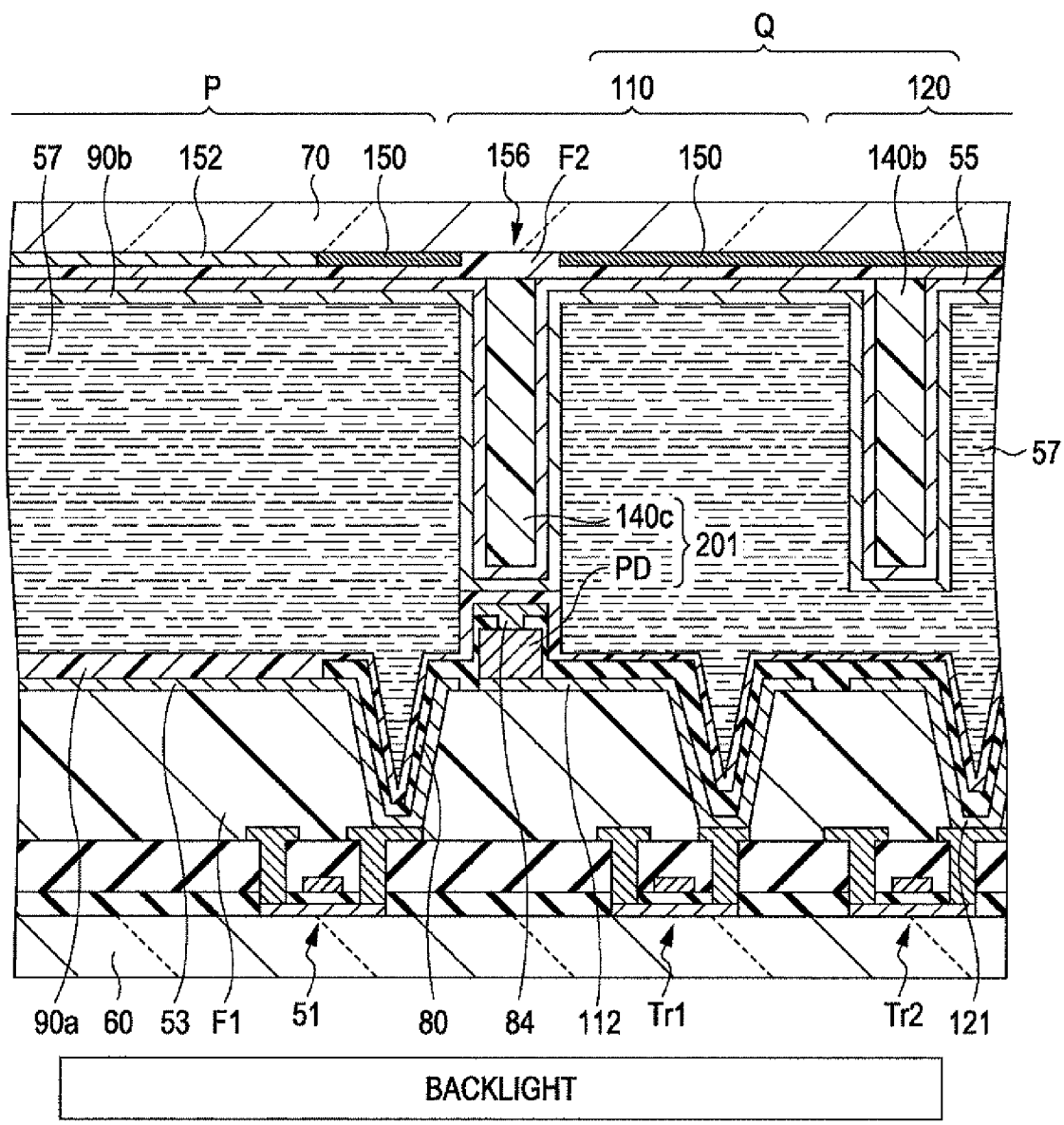
FIG. 3 is a cross-sectional view illustrating a display device according to a second embodiment of the invention.

FIG. 3 is a cross-sectional view illustrating a display device 10 according to a second embodiment of the invention (which corresponds to the cross-sectional view of FIG. 1). In this embodiment, the dummy photodiode 130 is not provided, and a protruding portion 140c that protrudes toward the first substrate 60 is provided in a region corresponding to the photodiode PD (a region corresponding to the transmission hole 156) on a surface of the second planarizing layer F2 facing the first substrate 60. As shown in FIG. 3, the top surface of the photodiode PD (one end of the photodiode PD that protrudes toward the second substrate 70) and the top surface of the protruding portion 140c (one end of the protruding portion 140c that protrudes toward the first substrate 60) are contacted with each other by, for example, the alignment films 90a and 90b. That is, in this embodiment, a spacer 201 defining the gap between the first substrate 60 and the second substrate 70 includes the photodiode PD and the protruding portion 140c contacted with each other. The protruding portion 140c is made of, for example, a translucent material, such as a transparent acrylic resin. In this way, light travels toward the first substrate 60 through the transmission hole 156 and is then incident on the photodiode PD through the protruding portion 140c.

In this embodiment, since the spacer 201 includes the photodiode PD and the protruding portion 140c, it is not necessary to provide a protruding portion, such as the dummy photodiode 130, on a surface of the pixel electrode 53 facing the second substrate 70, unlike the first embodiment. Therefore, it is possible to simplify the structure of a display device and it is easy to manufacture the display device 10. In addition, in this embodiment, it is not necessary to provide the light-shielding film 150 in a region facing the dummy photodiode 130 on the surface of the second substrate 70 facing the first substrate 60, unlike the first embodiment. Therefore, it is possible to increase the size of the opening 154 by a value corresponding to the light-shielding film and thus increase the area of the color filter 152. That is, it is possible to increase the light transmission area of a liquid crystal display portion.

Further, in this embodiment, the protruding portion 140b and the protruding portion 140c have the same height. Therefore, it is not necessary to provide a protruding portion with a different height on the surface of the second substrate 70 facing the first substrate 60. As a result, it is easy to manufacture the display device 10.

Modifications

The invention is not limited to the above-described embodiments. For example, the following modifications can be made. In addition, among the following first to fourth modifications, two or more modifications may be combined with each other.

(1) First Modification

In the above-described embodiments, a TN (twisted nematic) type in which an electric field is applied between the pixel electrode 53 provided on the first substrate 60 and the opposite electrode 55 provided on the second substrate 70 to control the alignment of the liquid crystal 57 is given as an example, but the invention is not limited thereto. The invention can be applied to a lateral electric field type in which an electric field is applied to the liquid crystal 57 in a direction that is substantially parallel to a substrate.

Figure 4:
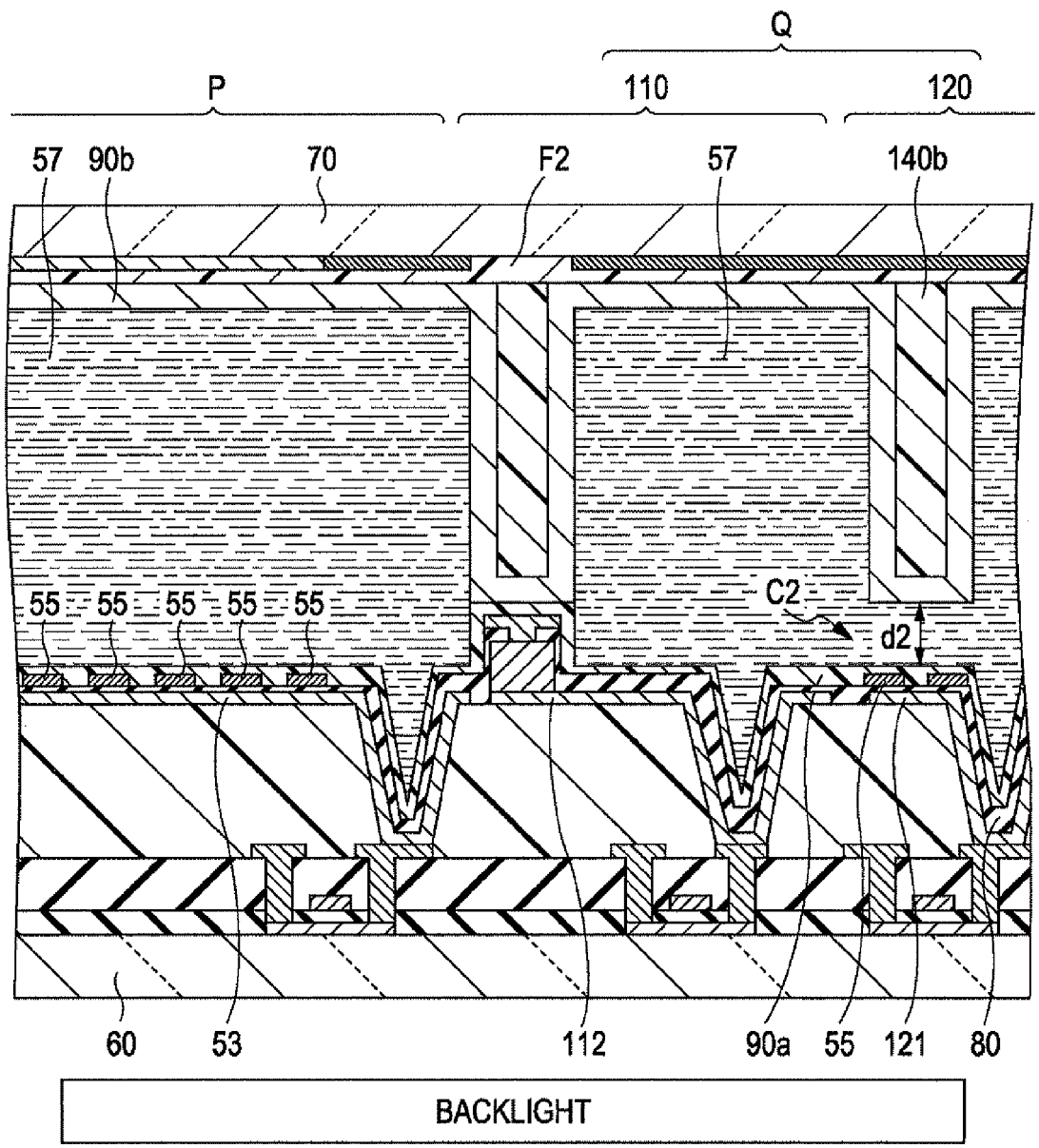
FIG. 4 is a cross-sectional view illustrating a display device according to a first modification of the invention.

FIG. 4 is a cross-sectional view illustrating the display device 10 according to the second embodiment to which an FFS (fringe field switching) system is applied (which corresponds to the cross-sectional view of FIG. 1). In FIG. 4, the opposite electrode 55 is not provided on the second substrate 70, and the pixel electrodes 53 and the opposite electrodes 55 are provided on the surface of the first substrate 60 facing the second substrate 70 so as to be opposite to each other. The alignment of the liquid crystal is controlled by a fringe electric field generated between the pixel electrodes 53 and the opposite electrodes 55 (an electric field generated in a direction that is substantially parallel to the first substrate 60 and the second substrate 70.

In the structure shown in FIG. 4, the capacitance detecting unit 120 includes a capacitive element C2 having the electrode 121 and a plurality of opposite electrodes 55 that are provided on a surface of the insulating film 80 facing the second substrate 70 so as to face the electrode 121. The plurality of opposite electrodes 55 are provided so as to be separated from each other. As shown in FIG. 4, a protruding portion 140b that protrudes toward the first substrate 60 is provided in a region that faces at least a portion of the electrode 121 and the opposite electrodes 55 of the capacitive element C2, on the surface of the second planarizing layer F2 facing the first substrate 60. In the structure shown in FIG. 4, a gap d2 between a portion of the alignment film 90b that covers the protruding portion 140b and the alignment film 90a is smaller than that in the structure in which the protruding portion 140b is not provided. Therefore, when an object contacts the display device 10 and the gap between the first substrate 60 and the second substrate 70 varies, a variation in the alignment of the liquid crystal 57 interposed between a portion of the alignment film 90b that covers the protruding portion 140b and the alignment film 90a is greater than that in the structure in which the protruding portion 140b is not provided. In this way, a variation in the capacitance value of the capacitive element C2 is also greater than that in the structure in which the protruding portion 140b is not provided. Therefore, according to the structure shown in FIG. 4, it is possible to sufficiently ensure a variation in the capacitance value when an object is contacted and it is not contacted. That is, it is possible to improve detection sensitivity.

In FIG. 4, the FFS display device is given as an example, but the invention is not limited thereto. For example, the invention can be applied to an IPS (in-plane switching) display device.

(2) Second Modification

In the above-described first embodiment, the spacer 200 includes the dummy photodiode 130 and the protruding portion 140a. However, for example, instead of the dummy photodiode 130, a protruding portion may be provided on the surface of the pixel electrode 53. For example, the spacer 200 may include the protruding portion 140a and a protruding portion (for example, the dummy photodiode 130) that is provided at a position that faces the protruding portion 140a on the surface of the second substrate 70 facing the first substrate 60 so as to protrude toward the first substrate 60.

(3) Third Modification

The positions and the number of contact detecting units Q are not particularly limited. For example, the contact detecting unit Q may be provided for a plurality of pixel circuits P, or the contact detecting unit Q may be provided for each pixel circuit P.

(4) Fourth Modification

In the above-described embodiments, each of the pixel circuits P includes the liquid crystal element 50, but the invention is not limited thereto. The electro-optical element (that is, the electro-optical element interposed between the first substrate 60 and the second substrate 70) included in each of the pixel circuit P may be arbitrarily changed. For example, each of the pixel circuits P may include an organic light emitting diode or an inorganic light emitting diode (LED).

Third Embodiment

Figure 5:
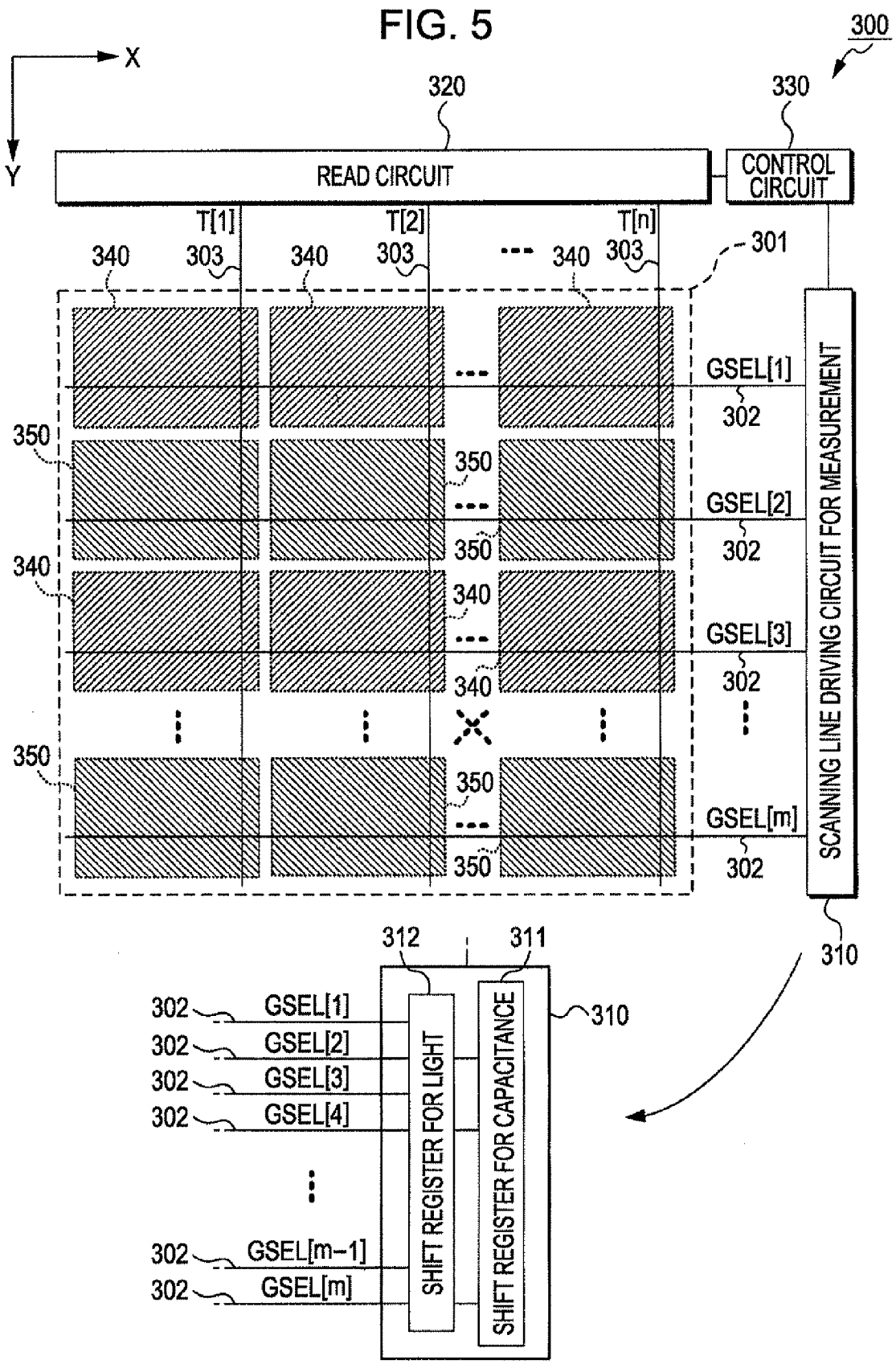
FIG. 5 is a block diagram illustrating a sensing circuit 300 according to a third embodiment of the invention.

FIG. 5 is a block diagram illustrating the structure of a sensing circuit 300 according to a third embodiment of the invention. The sensing circuit 300 includes a measurement region 301 in which a plurality of sensors are arranged in a matrix, a scanning line driving circuit 310 for measurement and a read circuit 320 that drive each of the sensors, and a control circuit 330 that controls the scanning line driving circuit 310 for measurement and the read circuit 320. The plurality of sensors include a plurality of light sensing circuits (light detecting units) 340 and a plurality of capacitance sensing circuits (capacitance detecting units) 350.

The measurement region 301 includes m measuring scanning lines 302 that extend in the X direction and n sensing lines 303 that extend in the Y direction orthogonal to the x direction (m is an even number that is equal to or greater than 2, and n is a natural number that is equal to or greater than 2). The sensors are provided at positions corresponding to intersections of the measuring scanning lines 302 and the sensing lines 303. Therefore, the sensors are arranged in a matrix of m rows by n columns.

The scanning line driving circuit 310 for measurement is controlled by a control circuit 330 and scans the m×n sensors. The scanning is so-called interlace scanning. Specifically, the scanning line driving circuit 310 for measurement sequentially activates odd-numbered or even-numbered measurement scanning signals GSEL[i] (i=1 to m) output to the m measuring scanning lines 302 for each horizontal scanning period (1H) to sequentially select the measuring scanning lines 302.

That is, the scanning line driving circuit 310 for measurement repeatedly performs an optical scanning operation of sequentially selecting m/2 odd-numbered measuring scanning lines 302 for each horizontal scanning period and a capacitance scanning operation of sequentially selecting m/2 even-numbered measuring scanning lines 302 for each horizontal scanning period for each frame. The structure of the scanning line driving circuit 310 for measurement is not particularly limited. In this embodiment, as shown in FIG. 5, the scanning line driving circuit 310 includes m/2-stage shift registers 311 for capacitance and m/2-stage shift registers 312 for light. The even-numbered measuring scanning lines 302 are connected to the stages of the shift registers 311 for capacitance, and the odd-numbered measuring scanning lines 302 are connected to the stages of the shift registers 312 for light.

The read circuit 320 reads measurement signals T[j] (j=1 to n) from the n sensing lines 303 under the control of the control circuit 330, and supplies the read signals to the control circuit 330. In the measurement signals T[j], a light measurement signal (first detection signal) T1[j] output to each of the n sensing lines 303 by a light sensing process (optical scanning) and a capacitance measurement signal (second detection signal) T2[j] output to each of the n sensing lines 303 by a capacitance sensing process (capacitance scanning) are alternately arranged for each frame.

The control circuit 330 controls the scanning line driving circuit 310 for measurement to repeatedly perform the optical scanning and the capacitance scanning, and controls the read circuit 320 to read the measurement signal T[j] (j=1 to n). In addition, the control circuit 330 acquires the measurement signal T[j] from the read circuit 320, and specifies the contact position between an object and the sensing circuit 300 on the basis of the measurement signal T[j].

The plurality of light sensing circuits 340 are disposed at positions corresponding to intersections of the odd-numbered measuring scanning lines 302 and the sensing lines 303, measure the amount of incident light, and output the light measurement signals T1[j]. Specifically, each of the light sensing circuits 340 includes a photodiode PD, which will be described below, and outputs the light measurement signal T1[j] having a level corresponding to the amount of light incident on the photodiode PD to the corresponding sensing line 303. In addition, n light sensing circuits 340 are connected to the odd-numbered measuring scanning lines 302, but the capacitance sensing circuits 350 are not connected to the odd-numbered measuring scanning lines 302.

The plurality of capacitance sensing circuits 350 are disposed at positions corresponding to intersections of the even-numbered measuring scanning lines 302 and the sensing lines 303, measure capacitance, and output the capacitance measurement signals. Specifically, each of the capacitance sensing circuits 350 includes a contact measuring capacitive element 351, which will be described below, and outputs the capacitance measurement signal T2[j] having a level corresponding to the capacitance value of the contact measuring capacitive element 351 to the corresponding sensing line 303. In addition, n capacitance sensing circuits 350 are connected to the even-numbered measuring scanning lines 302, but the light sensing circuits 340 are not connected to the even-numbered measuring scanning lines 302. That is, in the measurement region 301, rows of the light sensing circuits 340 and rows of the capacitance sensing circuits 350 are alternately arranged, and m/2 light sensing circuits 340 and m/2 capacitance sensing circuits 350 in each row are connected to each of the n sensing lines 303.

Although not shown in the drawings, the sensing circuit 300 includes a first substrate (which corresponds to the first substrate 60 shown in FIGS. 2 to 4) that extends in the X direction and the Y direction and a second substrate (which corresponds to the second substrate 70 shown in FIGS. 2 to 4) that extends in the x direction and the Y direction. The two substrates face each other. The m measuring scanning lines 302, the n sensing lines 303 and the m×n sensors are provided between the two substrates. That is, each of the m measuring scanning lines 302 extends along the two substrates, each of the n sensing lines 303 extends along the two substrates, and a plurality of sensors are arranged in a matrix along the two substrates. In addition, a dielectric material, such as liquid crystal, is interposed between the two substrates. The dielectric material is included in each of the plurality of capacitance sensing circuits 350, and forms the contact measuring capacitive element 351, which will be described below. The two substrates may be made of any material. However, one of the substrates having a surface contacted with an object (contact surface) needs to be made of a translucent material, such as glass.

Figure 6:
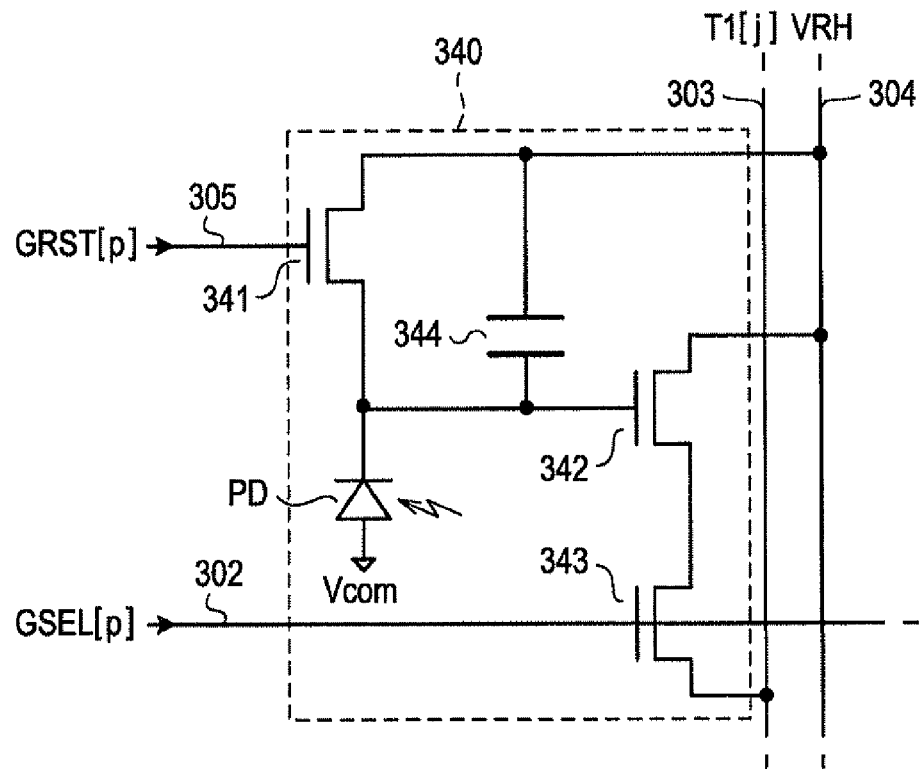
FIG. 6 is a circuit diagram illustrating a light sensing circuit 340 of the sensing circuit 300.

FIG. 6 is a circuit diagram illustrating the structure of the light sensing circuit 340. As shown in FIG. 6, the light sensing circuit 340 includes a reset transistor 341, an amplifying transistor 342, a selecting transistor 343, a reference capacitive element 344, and the photodiode PD. The reset transistor 341, the amplifying transistor 342, and the selecting transistor 343 are all N-channel transistors. A common potential Vcom is supplied to an anode of the photodiode PD.

A drain of the reset transistor 341 is connected to a power supply line 304, and a source thereof is connected to a gate of the amplifying transistor 342. A power supply potential VRH is supplied to the power supply line 304. A gate of the reset transistor 341 is connected to a control line 305, which is one of m control lines 305 that extend in the X direction. The scanning line driving circuit 310 for measurement sequentially activates reset signals GRST[p] output to the m control lines 305 for each horizontal scanning period (p is an odd number that is equal to or greater than 1 and equal to or less than m). When the reset signal GRST[p] is at an active level (for example, potential VD), the reset transistor 341 is turned on. When the reset signal GRST[p] is at an inactive level (for example, GND (=0 V)), the reset transistor is turned off.

A drain of the amplifying transistor 342 is connected to the power supply line 304, and a source thereof is connected to a drain of the selecting transistor 343. The reference capacitive element 344 is interposed between the gate of the amplifying transistor 342 and the drain of the reset transistor 341. In addition, the gate of the amplifying transistor 342 is connected to a cathode of the photodiode PD. A source of the selecting transistor 343 is connected to the sensing line 303, and a gate thereof is connected to the measuring scanning line 302. A measurement scanning signal GSEL[p] is supplied to the measuring scanning line 302. When the measurement scanning signal GSEL[p] is at a high level, the selecting transistor 343 is turned on. When the measurement scanning signal GSEL[p] is at a low level, the selecting transistor is turned off.

Figure 7:
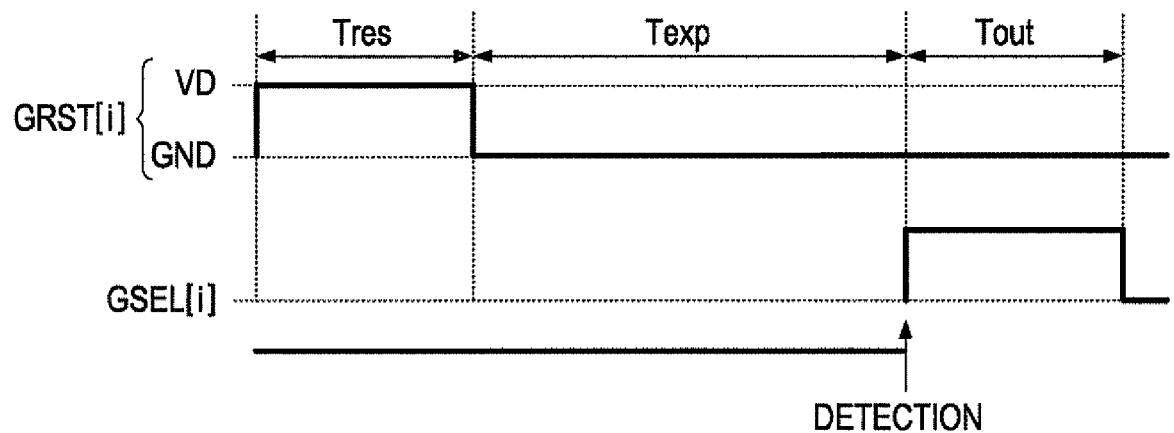
FIG. 7 is a timing chart illustrating the operation of the light sensing circuit 340.
Figure 8:
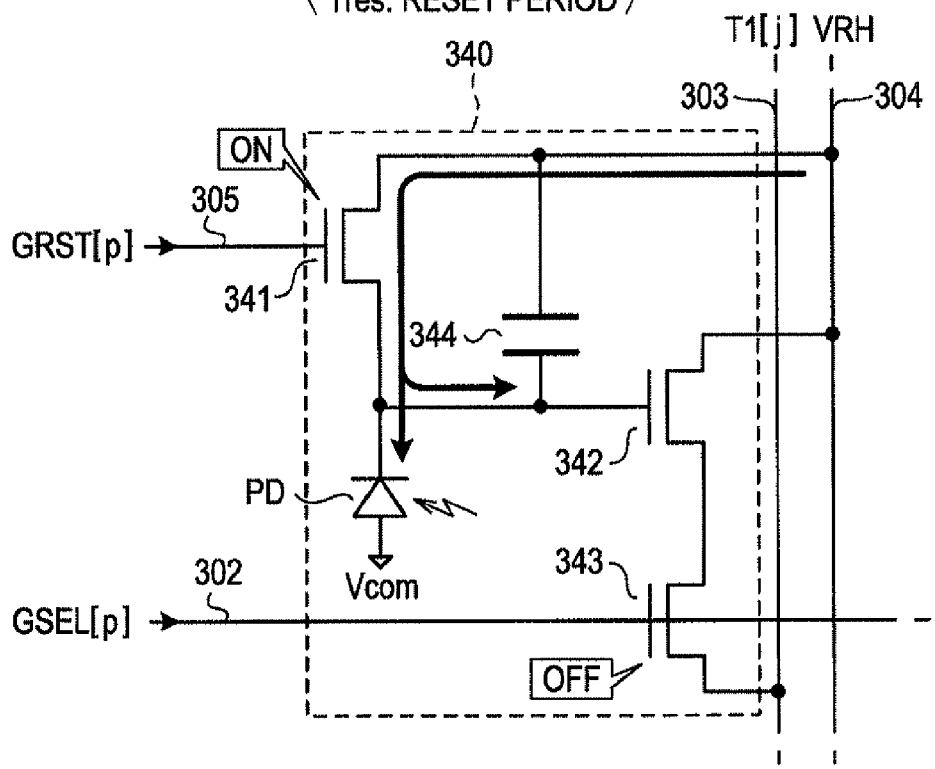
FIG. 8 is a diagram illustrating the operation of the light sensing circuit 340.

As shown in FIG. 7, the light sensing circuit 340 is operated in a cycle of a reset period Tres, an exposure period Texp, and a read period Tout. During the reset period Tres, the reset signal GRST[p] supplied to the control line 305 is changed to an active level, and the measurement scanning signal GSEL[p] supplied to the measuring scanning line 302 is maintained at a low level. Therefore, as shown in FIG. 8, during the reset period Tres, the reset transistor 341 is turned on, and the selecting transistor 343 is turned off. Then, the potential VA of the gate of the amplifying transistor 342 is set (reset) to the power supply potential VRH. The power supply potential VRH is also supplied to the cathode of the photodiode PD, and a voltage between the anode and the cathode of the photodiode PD is maintained at a level of VRH−Vcom.

Figure 9:
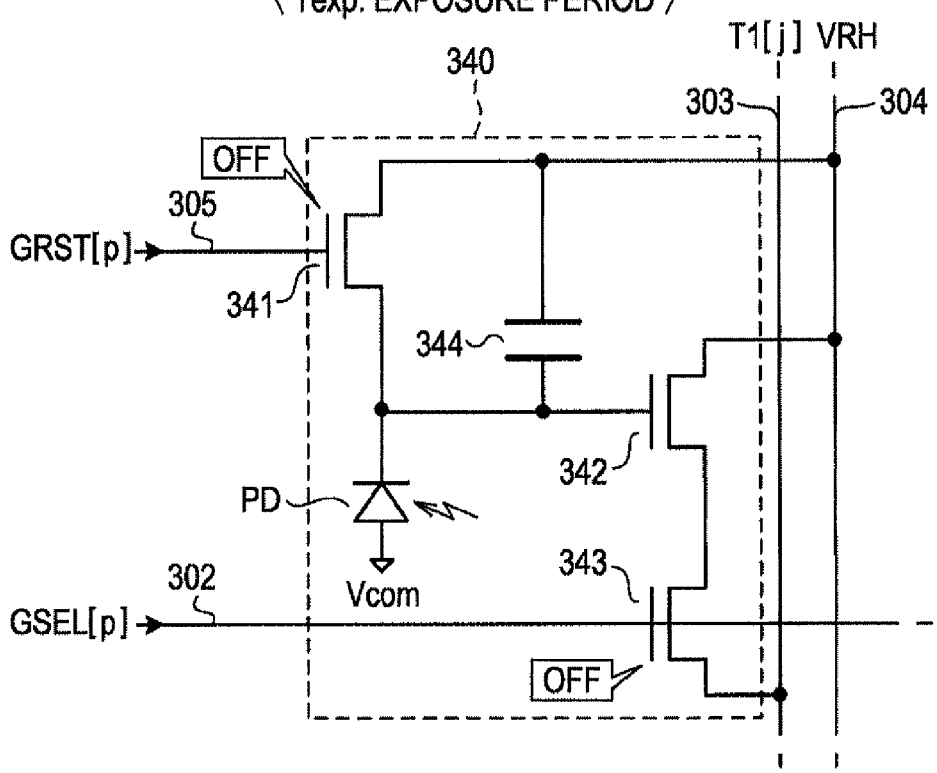
FIG. 9 is a diagram illustrating the operation of the light sensing circuit 340.

As shown in FIG. 7, during the exposure period Texp subsequent to the reset period Tres, the reset signal GRST[p] is changed to an inactive level, and the measurement scanning signal GSEL[p] is maintained at the low level. Therefore, as shown in FIG. 9, the reset transistor 341 is turned off, and the selecting transistor 343 is maintained in the off state. Then, charge stored in the reference capacitive element 344 is discharged by the photodiode PD. As a result, when the voltage of the photodiode PD is referred to as Vpd, the potential VA of the gate of the amplifying transistor 342 satisfies VA=VRH−Vpd. The voltage Vpd depends on the amount of light (environment light) incident on the photodiode PD.

Figure 10:
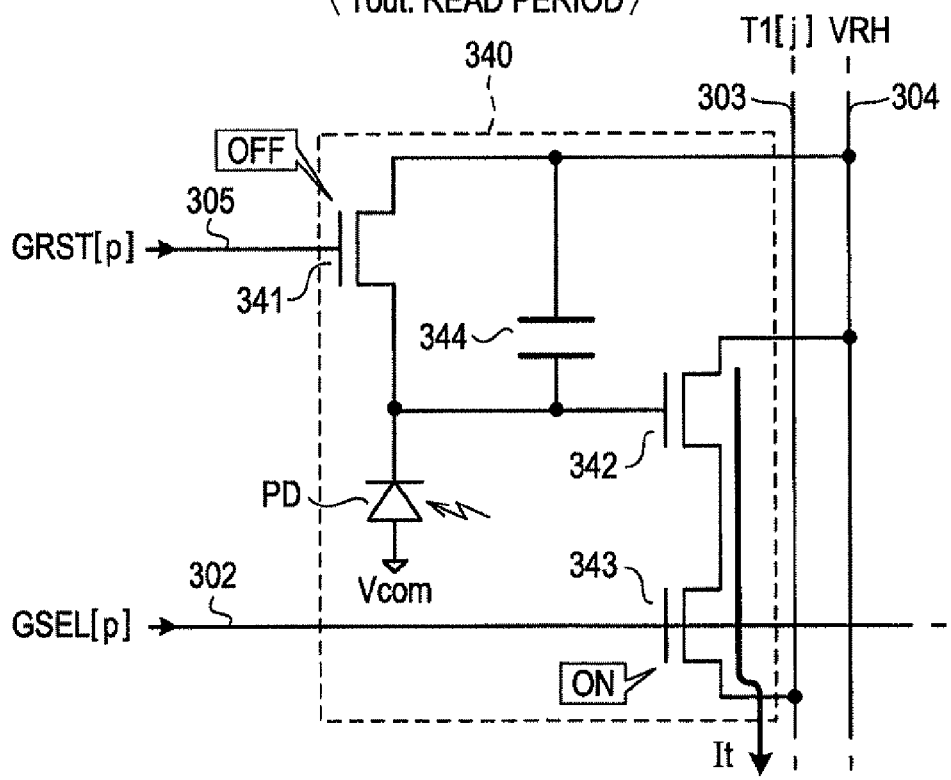
FIG. 10 is a diagram illustrating the operation of the light sensing circuit 340.

As shown in FIG. 7, during the read period Tout subsequent to the exposure period Texp, the measurement scanning signal GSEL[p] is changed to a high level. Therefore, as shown in FIG. 10, the selecting transistor 343 is turned on. In this case, since the reset transistor 341 is maintained in an off state, a current It corresponding to the potential VA of the gate of the amplifying transistor 342 is supplied to the read circuit 320 through the sensing line 303. Then, the light measurement signal T1[j] is output.

During the exposure period Texp, when an object contacts or approaches the sensing circuit 300, the amount of light incident on the photodiode PD varies. When the amount of light incident on the photodiode PD varies, the potential VA of the gate of the amplifying transistor 342 also varies. Therefore, the level of the light measurement signal T1[j] output when no object contacts or approaches the contact surface is different from the level of the light measurement signal T1[j] output when an object contacts or approaches the contact surface. This characteristic is used to specify the contact position.

Figure 11:
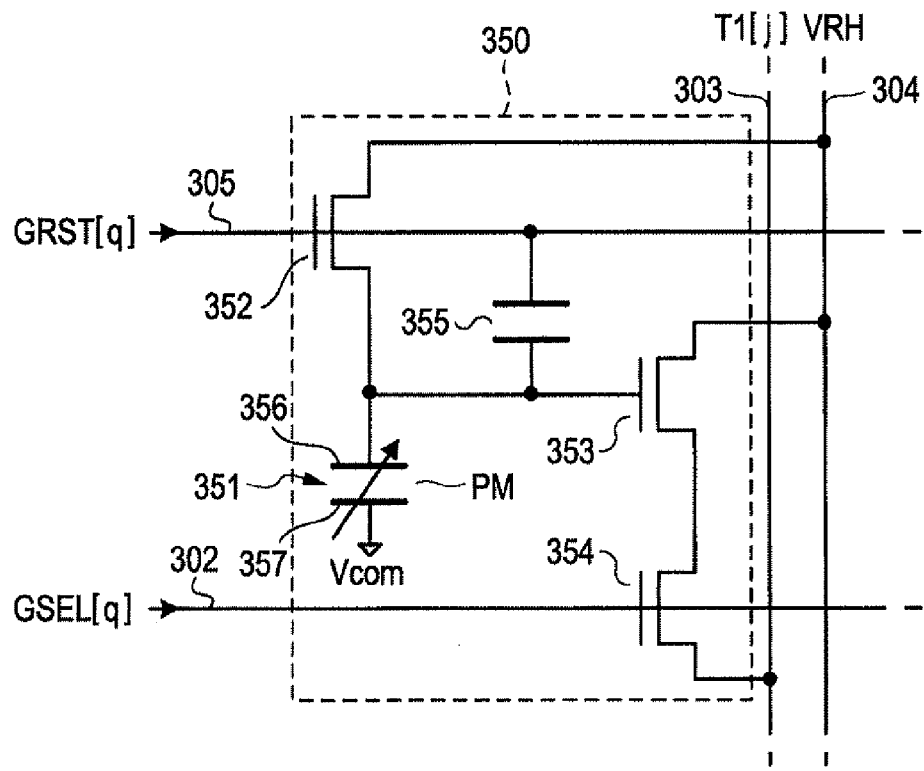
FIG. 11 is a circuit diagram illustrating a capacitance sensing circuit 350 of the sensing circuit 300.

FIG. 11 is a circuit diagram illustrating the structure of the capacitance sensing circuit 350. As shown in FIG. 11, the capacitance sensing circuit 350 includes a reset transistor 352, an amplifying transistor 353, a selecting transistor 354, a reference capacitive element 355, and a contact measuring capacitive element 351. The reset transistor 352, the amplifying transistor 353, and the selecting transistor 354 are all N-channel transistors. The contact measuring capacitive element 351 includes a first electrode 356, a second electrode 357, and a dielectric material PM to which an electric field generated between the two electrodes is applied. The dielectric material PM is the above-mentioned dielectric material interposed between the first substrate and the second substrate. The common potential Vcom is supplied to the second electrode 357.

A drain of the reset transistor 352 is connected to the power supply line 304, and a source thereof is connected to a gate of the amplifying transistor 353. The power supply potential VRH is supplied to the power supply line 304. A gate of the reset transistor 352 is connected to the control line 305. The scanning line driving circuit 310 for measurement sequentially activates reset signals GRST[q] output to the m control lines 305 for each horizontal scanning period (q is an even number that is equal to or greater than 1 and equal to or less than m). When the reset signal GRST[q] is at an active level, the reset transistor 352 is turned on. When the reset signal GRST[q] is at an inactive level, the reset transistor 352 is turned off.

A drain of the amplifying transistor 353 is connected to the power supply line 304, and a source thereof is connected to a drain of the selecting transistor 354 The reference capacitive element 355 is interposed between the gate of the amplifying transistor 353 and the control line 305. In addition, the gate of the amplifying transistor 353 is connected to the first electrode 356 of the contact measuring capacitive element 351. A source of the selecting transistor 354 is connected to the sensing line 303, and a gate thereof is connected to the measuring scanning line 302. A measurement scanning signal GSEL[q] is supplied to the measuring scanning line 302. When the measurement scanning signal GSEL[q] is at a high level, the selecting transistor 354 is turned on. When the measurement scanning signal GSEL[q] is at a low level, the selecting transistor 354 is turned off.

Figure 12:
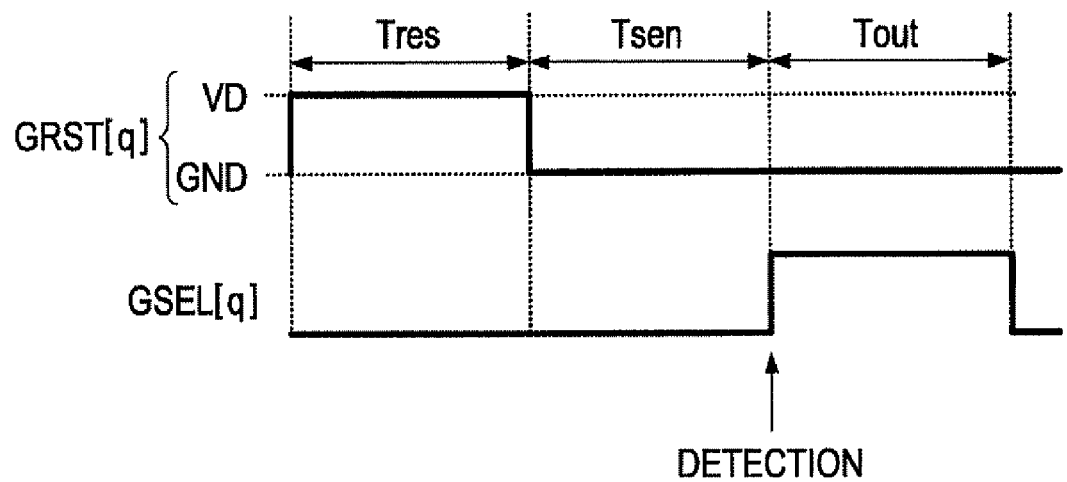
FIG. 12 is a timing chart illustrating the operation of the capacitance sensing circuit 350.
Figure 13:
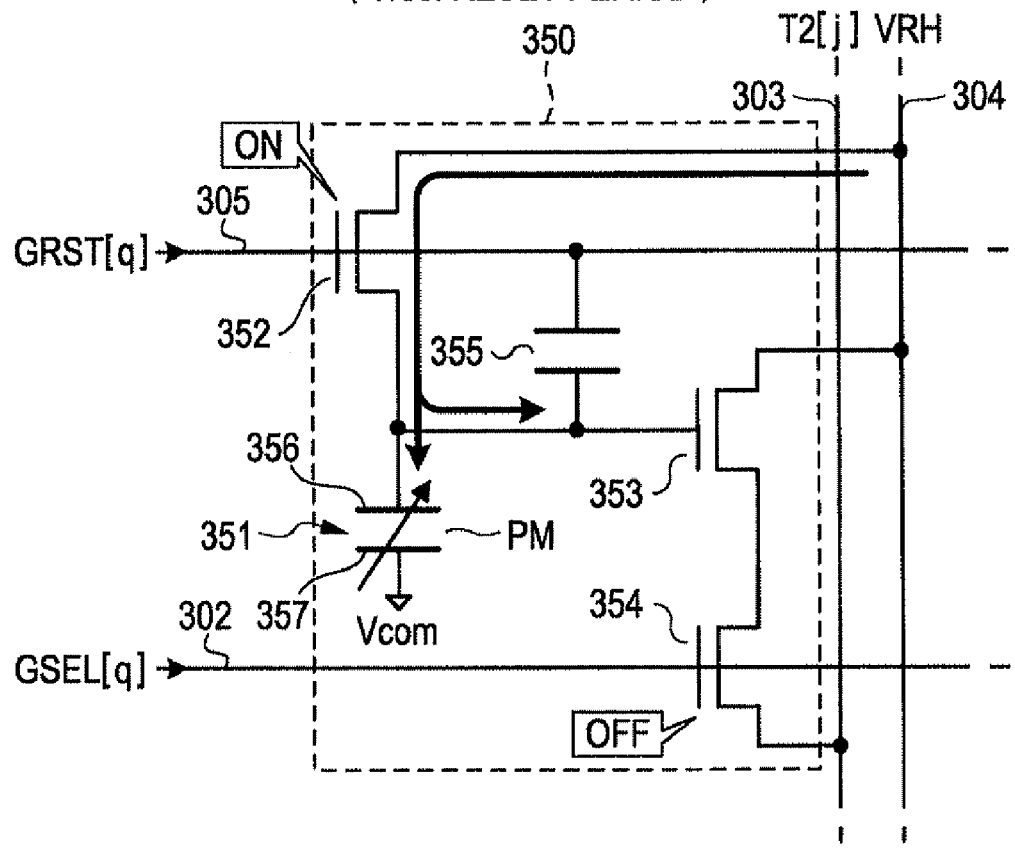
FIG. 13 is a diagram illustrating the operation of the capacitance sensing circuit 350.

As shown in FIG. 12, the capacitance sensing circuit 350 is operated in a cycle of a reset period Tres, a sensing period Tsen, and a read period Tout. During the reset period Tres, the reset signal GRST[q] supplied to the control line 305 is changed to an active level, and the measurement scanning signal GSEL[q] supplied to the measuring scanning line 302 is maintained at a low level. Therefore, as shown in FIG. 13, during the reset period Tres, the reset transistor 352 is turned on, and the selecting transistor 354 is turned off. Then, the potential VA of the gate of the amplifying transistor 353 is set (reset) to the power supply potential VRH. In addition, the power supply potential VRH is supplied to the first electrode 356 of the contact measuring capacitive element 351, and the voltage between the first electrode 356 and the second electrode 357 of the contact measuring capacitive element 351 is maintained at a level of VRH−Vcom.

Figure 14:
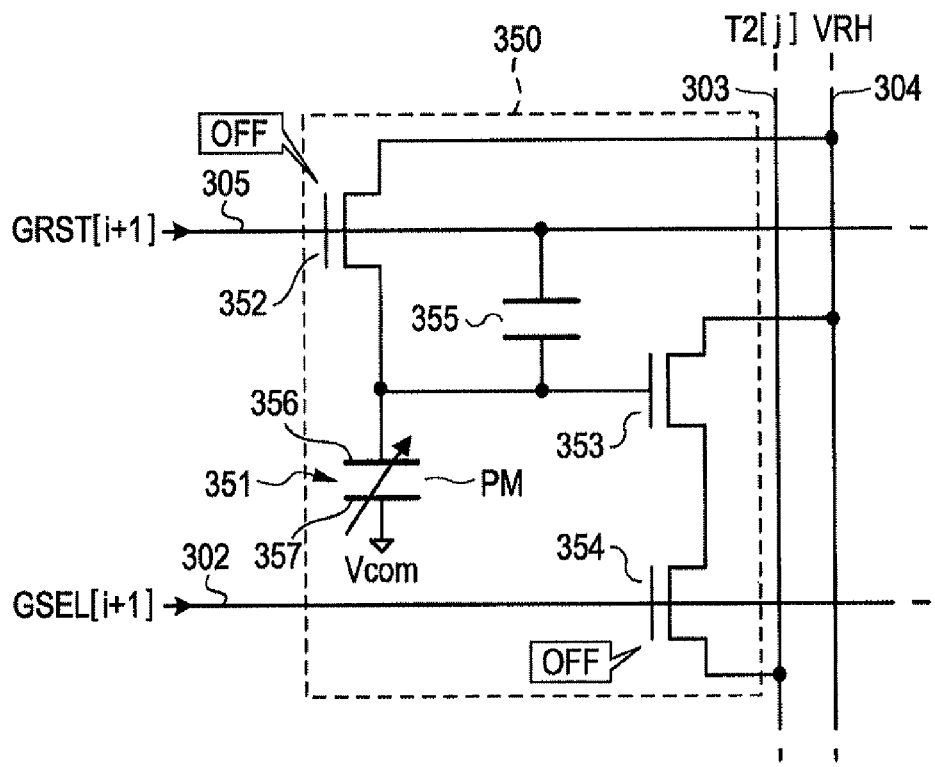
FIG. 14 is a diagram illustrating the operation of the capacitance sensing circuit 350.

As shown in FIG. 12, during the sensing period Tsen subsequent to the reset period Tres, the reset signal GRST[q] is changed to an inactive level, and the measurement scanning signal GSEL[q] is maintained at the low level. Therefore, as shown in FIG. 14, the reset transistor 352 is turned off, and the selecting transistor 354 is maintained in an off state. Since the gate of the amplifying transistor 353 has sufficiently large impedance, it is in an electrically floating state during the sensing period Tsen. One electrode of the reference capacitive element 355 is connected to the control line 305. Therefore, when the level of the reset signal GRST[q] supplied to the control line 305 is changed from an active level to an inactive level, the potential VA of the gate of the amplifying transistor 353 is also changed by capacitance coupling. In this case, the change in the potential VA of the gate depends on the capacitance ratio between the reference capacitive element 355 and the contact measuring capacitive element 351.

Figure 15:
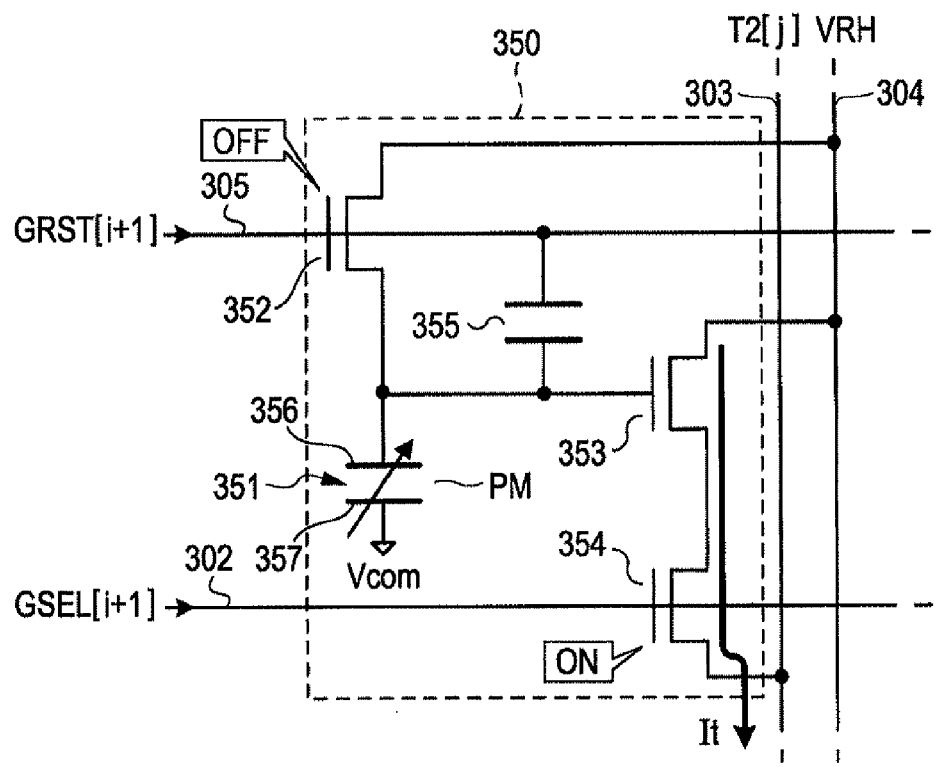
FIG. 15 is a diagram illustrating the operation of the capacitance sensing circuit 350.

As shown in FIG. 12, during the read period Tout subsequent to the sensing period Tsen, the measurement scanning signal GSEL[q] is at a high level. Therefore, as shown in FIG. 15, the reset transistor 352 is maintained in the off state, and the selecting transistor 354 is turned off. Then, a current It corresponding to the potential VA of the gate of the amplifying transistor 353 is supplied to the read circuit 320 through the sensing line 303. In this way, a capacitance measurement signal T2[j] is output.

During the sensing period Tsen, when an object contacts the contact surface, the capacitance value of the contact measuring capacitive element 351 varies. When the capacitance value of the contact measuring capacitive element 351 varies, the potential VA of the gate of the amplifying transistor 353 also varies. Therefore, the level of the capacitance measurement signal T2[j] output when no object contacts the contact surface is different from the level of the capacitance measurement signal T2[j] output when an object contacts the contact surface. This characteristic is used to specify the contact position.

When the capacitance value of the contact measuring capacitive element 351 when no object contacts the contact surface is Clc, a variation in the capacitance value of the contact measuring capacitive element 351 when an object contacts the contact surface is ΔClc, the capacitance value of the reference capacitive element 355 is Cref, and a variation in the potential of the control line 305 is ΔV (=VD), a variation ΔVA in the potential VA of the gate of the amplifying transistor 353 when an object contacts the contact surface is represented by Expression 1 given below:

$$\Delta VA = \{(Cref \times \Delta Clc) \times \Delta V\} / \{(Cref + Clc + \Delta Clc)(Cref + Clc)\}. \quad \text{[Expression 1]}$$

However, in Expression 1, parasitic capacitance is neglected.

Figure 16:
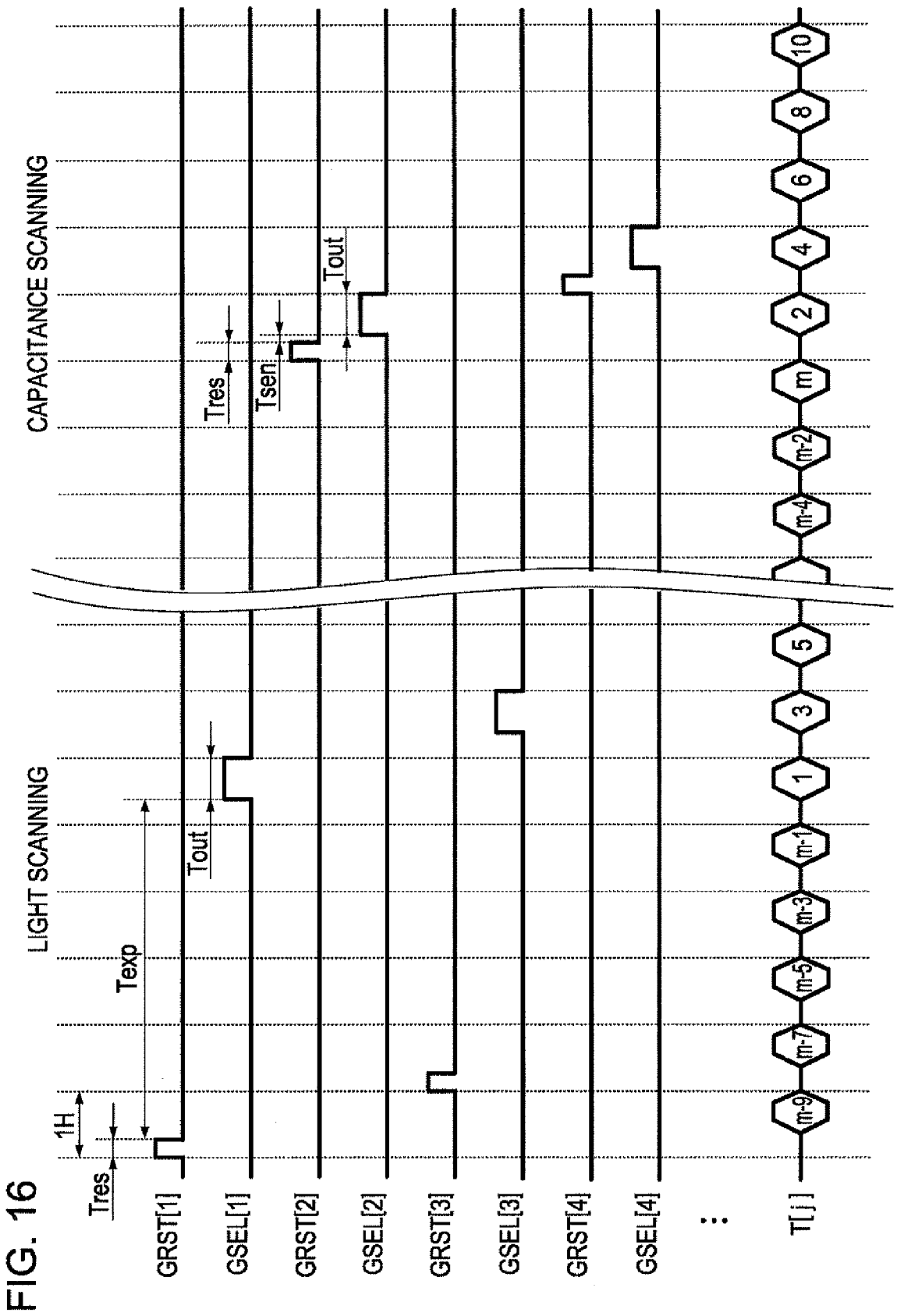
FIG. 16 is a timing chart illustrating the operation of the sensing circuit 300.

FIG. 16 is a timing chart illustrating the operation of the sensing circuit 300. As shown in FIG. 16, in an optical scanning operation, for a horizontal scanning period (1H), the reset signal GRST[1] supplied from the first control line 305 to the light sensing circuits 340 in the first row is changed to an active level, and the light sensing circuits 340 in the first row reach the reset period Tres. Then, for the horizontal scanning period, the reset signal GRST[1] is changed to an inactive level, and the light sensing circuits 340 in the first row reach the exposure period Texp.

For the next horizontal scanning period, the reset signal GRST[3] supplied from the third control line 305 to the light sensing circuits 340 in the third row is changed to an active level, and the light sensing circuits 340 in the third row reach the reset period Tres. Then, for this horizontal scanning period, the reset signal GRST[3] is changed to an inactive level, and the light sensing circuits 340 in the third row reach the exposure period Texp.

Then, for the next horizontal scanning period, the measurement scanning signal GSEL[1] supplied from the first measuring scanning line 302 to the light sensing circuits 340 in the first row is changed from a low level to a high level, and the light sensing circuits 340 in the first row reach the read period Tout. When the horizontal scanning period ends, the measurement scanning signal GSEL[1] is changed to the low level, and the read period Tout ends. During the read period Tout, the levels of the measurement signals T[j] (light measurement signals T1[j]) supplied from the light sensing circuits 340 in the first row to the read circuit 320 through the n sensing lines 303 correspond to the amount of light incident on the photodiodes PD of the light sensing circuits 340.

For the next horizontal scanning period, the measurement scanning signal GSEL[3] supplied from the third measuring scanning line 302 to the light sensing circuits 340 in the third row is changed from a low level to a high level, and the light sensing circuits 340 in the third row reach the read period Tout. Then, when this horizontal scanning period ends, the measurement scanning signal GSEL[3] is changed to the low level, and the read period Tout ends, During the read period Tout, the levels of the measurement signals T[j] (light measurement signals T1[j]) supplied from the light sensing circuits 340 in the third row to the read circuit 320 through the n sensing line 303 correspond to the amount of light incident on each of the photodiodes PD of the light sensing circuits 340.

As such, in the optical scanning operation, the odd-numbered light sensing circuits 340 are sequentially operated in a cycle (the reset period Tres, the exposure period Texp, and the read period Tout) for each horizontal scanning period, and the levels of the measurement signals T[j] (light measurement signals T1[j]) supplied to the read circuit 320 correspond to the amount of light incident on each of the photodiodes PD of the light sensing circuits 340 during the read period. In addition, the length of the exposure period Texp shown in FIG. 16 is just an example. The exposure period may have any length as long as the length is sufficiently long to allow the levels of the measurement signals T[j] (light measurement signals T1[j]) supplied from the light sensing circuits 340 to correspond to the amount of light incident on each of the photodiodes PD of the light sensing circuits 340. It is possible to change the length of the exposure period Texp by changing the rising time of the measurement scanning signal GSEL[p].

On the other hand, in the capacitance scanning operation, for a certain horizontal scanning period, the reset signal GRST[2] supplied from the second control line 305 to the capacitance sensing circuits 350 in the second row is changed to an active level, and the capacitance sensing circuits 350 in the second row reach the reset period Tres. Then, for the horizontal scanning period, the reset signal GRST[2] is changed to an inactive level, and the capacitance sensing circuits 350 in the second row reach the sensing period Tsen. Then, the measurement scanning signal GSEL[2] supplied from the second measuring scanning line 302 to the capacitance sensing circuits 350 in the second row is changed from a low level to a high level, and the capacitance sensing circuits 350 in the second row reach the read period Tout. Then, when the horizontal scanning period ends, the measurement scanning signal GSEL[2] is changed to a low level, and the read period Tout ends. During the read period Tout, the levels of the measurement signals T[j] (capacitance measurement signals T2[j]) supplied from the capacitance sensing circuits 350 in the second row to the read circuit 320 through the n sensing lines 303 correspond to the capacitance values of the contact measuring capacitive elements 351 of the capacitance sensing circuits 350.

For the next horizontal scanning period, the reset signal GRST[4] supplied from the fourth control line 305 to the capacitance sensing circuits 350 in the fourth row is changed to an active level, and the capacitance sensing circuits 350 in the fourth row reach the reset period Tres. Then, for this horizontal scanning period, the reset signal GRST[4] is changed to an inactive level, and the capacitance sensing circuits 350 in the fourth row reach the sensing period Tsen. Then, the measurement scanning signal GSEL[4] supplied from the fourth measuring scanning line 302 to the capacitance sensing circuits 350 in the fourth row is changed from a low level to a high level, and the capacitance sensing circuits 350 in the fourth row reach the read period Tout. When this horizontal scanning period ends, the measurement scanning signal GSEL[4] is changed to the low level, and the read period Tout ends. During the read period Tout, the levels of the measurement signals T[j] (capacitance measurement signals T2[j]) supplied from the capacitance sensing circuits 350 in the fourth row to the read circuit 320 through the n sensing lines 303 correspond to the capacitance values of the contact measuring capacitive elements 351 of the capacitance sensing circuits 350.

As such, in the capacitance scanning operation, the even-numbered capacitance sensing circuits 350 are sequentially operated in a cycle (the reset period Tres, the sensing period Tsen, and the read period Tout) for each horizontal scanning period, and the levels of the measurement signals T[j] (capacitance measurement signals T2[j]) supplied to the read circuit 320 correspond to the capacitance values of the contact measuring capacitive elements 351 of the capacitance sensing circuits 350 during the read period. In addition, the length of the sensing period Tsen shown in FIG. 16 is just an example. The sensing period may have any length as long as the length is sufficiently long to allow the levels of the measurement signals T[j] (capacitance measurement signals T2[j]) supplied from the capacitance sensing circuits 350 to correspond to the capacitance values of the contact measuring capacitive elements 351 of the capacitance sensing circuits 350. It is possible to change the length of the sensing period Tsen by changing the rising time of the measurement scanning signal GSEL[q].

Figure 17:
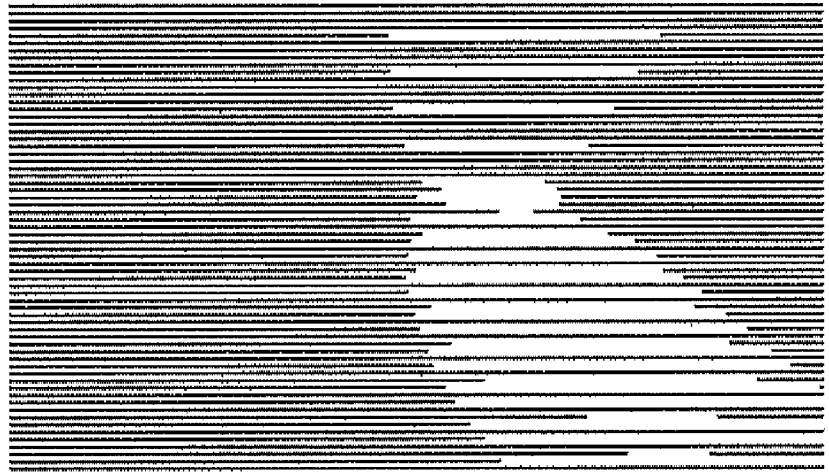
FIG. 17 is a diagram schematically illustrating an example of an optical image obtained by the sensing circuit 300.

The control circuit 330 obtains an image shown in FIG. 17 on the basis of the light measurement signals T1[j] from m/2×n light sensing circuits 340 for an optical scanning frame. The control circuit 330 binarizes the image (the light measurement signals T1[j]) on the basis of a predetermined threshold value (reference level), and specifies a region including a point where an object contacts or approaches (optical region). In the binarization, for example, pixels in the optical region have a value of 1, and the other pixels have a value of 0. In addition, in the image shown in FIG. 17, for convenience of description, a bright portion has a deep color and a dark portion has a light color. However, actually, an image (optical image) in which a region (which is disposed in the vicinity of the center of FIG. 17) including a point where an object contacts or approaches is dark and the color becomes bright as the distance from the region is increased is obtained.

Figure 18:
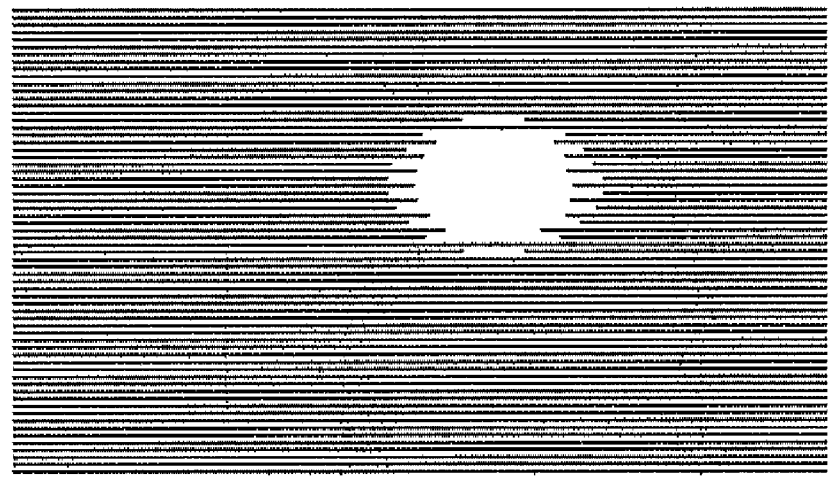
FIG. 18 is a diagram schematically illustrating an example of a capacitance image obtained by the sensing circuit 300.

In addition, the control circuit 330 obtains an image shown in FIG. 18 on the basis of the capacitance measurement signals T2[j] from m/2×n capacitance sensing circuits 350 for a capacitance scanning frame. That is, an image (capacitance image) in which a region (which is disposed in the vicinity of the center of FIG. 18) including a point where an object contacts is bright and the color becomes dark as the distance from the region is increased is obtained. The control circuit 330 binarizes the image (the capacitance measurement signals T2[j]) on the basis of a predetermined threshold value (reference level), and specifies a region (capacitance region) including a point where an object contacts. In the binarization, for example, pixels in the capacitance region have a value of 1, and the other pixels have a value of 0.

As can be seen from FIGS. 17 and 18, generally, the capacitance region is larger than the optical region. This becomes remarkable when there is a plurality of contact points. The reason is as follows: when there is a plurality of contact points, the first substrate or the second substrate is likely to be curved in a wide range between the plurality of contact points At the worst, one capacitance region is likely to include a plurality of contact points. In general, the detection accuracy of a method of using a capacitance image to detect whether an object contacts the sensing circuit 300 is higher than that of a method of using an optical image. In the detecting method using the optical image, when an object does not contact the display device but approaches it, the sensing circuit is likely to determine that an object contacts the display device. However, in the detecting method using the capacitance image, the above-mentioned detection error does not occur.

Figure 19:
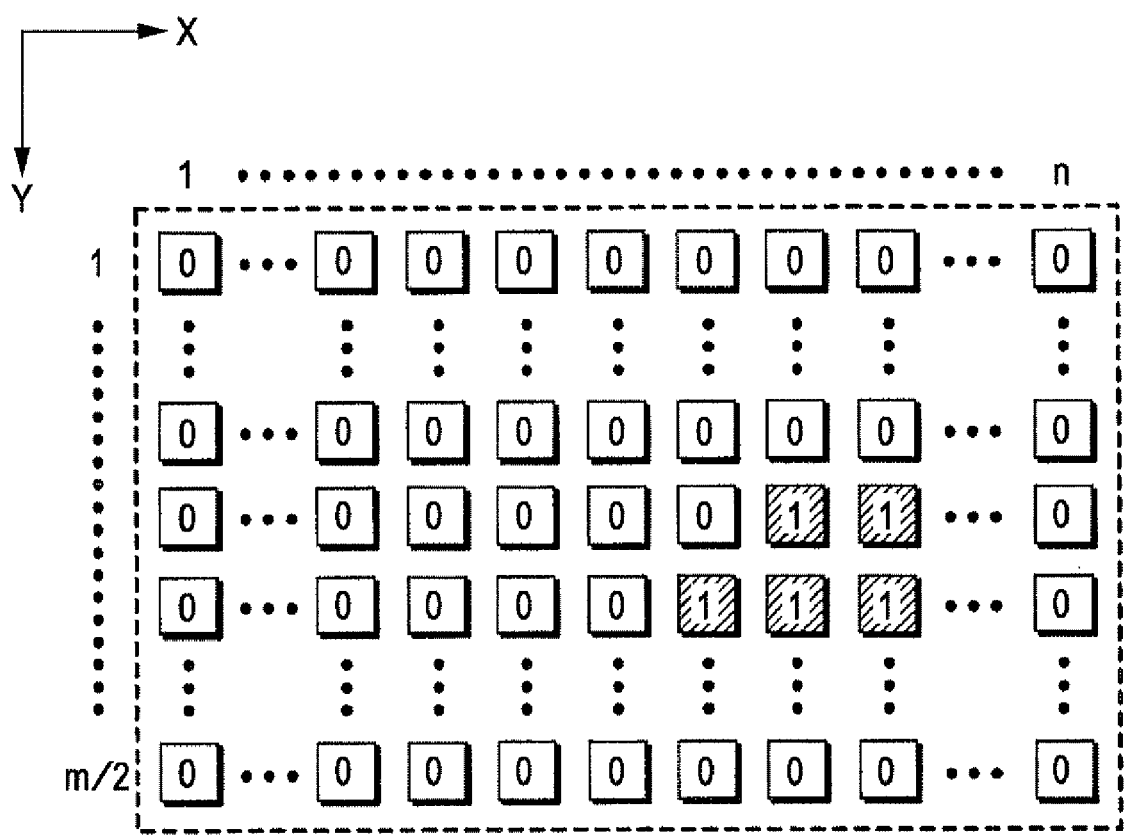
FIG. 19 is a diagram schematically illustrating an example of a combined binarized image obtained by the sensing circuit 300.

In the sensing circuit 300, the control circuit 330 calculates a logical product of the pixels corresponding to each other in the binarized optical image and the binarized capacitance image for every two frames to combine the images, and specifies the contact position between an object and the sensing circuit 300 on the basis of the combined binarized image. FIG. 19 is a diagram schematically illustrating the combined binarized image.

As described above, the sensing circuit 300 includes the first and second substrates that face each other, the dielectric material PM interposed between the two substrates, a plurality of measuring scanning lines 302 that extend along the two substrates between the two substrates, and a plurality of capacitance sensing circuits 350 and a plurality of light sensing circuits 340 that are arranged in a matrix along the two substrates between the two substrates. In the sensing circuit 300, the light sensing circuits 340 in a j-th column are connected to the measuring scanning line 302 that is not connected to any of the plurality of capacitance sensing circuits 350, and output the light measurement signals T1[j] having a level corresponding to the amount of incident light. In addition, in the sensing circuit 300, the capacitance sensing circuits 350 in the j-th column are connected to the measuring scanning line 302 that is not connected to the plurality of light sensing circuits 340, and include the contact measuring capacitive elements 351 each having the dielectric material PM, the first electrode 356, and the second electrode 357. The capacitance sensing circuits 350 output the capacitance measurement signals T2[j] having levels corresponding to the capacitance values of the contact measuring capacitive elements 351.

Therefore, the sensing circuit 300 can accurately specify the contact position between an object and the display device on the basis of the measurement signals. In addition, according to the sensing circuit 300, one row selecting operation is performed to select only the light sensing circuits 340 or the capacitance sensing circuits 350, and the sensors selected by one row selecting operation output only the light measurement signal T1 or the capacitance measurement signal T2. Therefore, it is possible to simplify the data processing of a circuit in the next stage.

Further, the sensing circuit 300 includes a plurality of sensing lines 303 that extend along the first substrate and the second substrate between the two substrates, and the capacitance sensing circuits 350 and the light sensing circuits 340 are connected to the sensing lines 303. That is, in the sensing circuit 300, the sensing lines 303 are common to the capacitance sensing circuits 350 and the light sensing circuits 340. Therefore, according to the sensing circuit 300, for example, it is possible to increase the aperture ratios of the light sensing circuit 340 and the pixel circuit.

In this embodiment, as described above, interlace scanning is performed. That is, a capacitance sensing (capacitance scanning) process of driving m/2×n capacitance sensing circuits 350 and a light sensing (optical scanning) process of driving m/2×n light sensing circuits 340 are alternately performed for each frame. An optical image based on only the light measurement signals T1[j] output from the light sensing circuits 340 and a capacitance image based on only the capacitance measurement signals T2[j] output from the capacitance sensing circuits 350 are obtained for each frame. Therefore, according to this embodiment, it is possible to simplify the data processing of a circuit in the next stage.

Any of the following methods may be used to combine the advantages of the optical scanning method with the advantages of the capacitance scanning method: a method of providing the contact measuring capacitive element in the light sensing circuit 340 and connecting the contact measuring capacitive element in parallel to the photodiode PD; and a method of providing a photodiode in the capacitance sensing circuit 350 and connecting the photodiode in parallel to the contact measuring capacitive element 351. However, in the above-mentioned methods, it is difficult to solve the problem that the output current of the photodiode is significantly smaller than that of the contact measuring capacitive element during a reset operation. In contrast, in this embodiment, since the light sensing circuits and the capacitance sensing circuits are individually provided, the above-mentioned problem does not arise.

Fourth Embodiment

Figure 20:
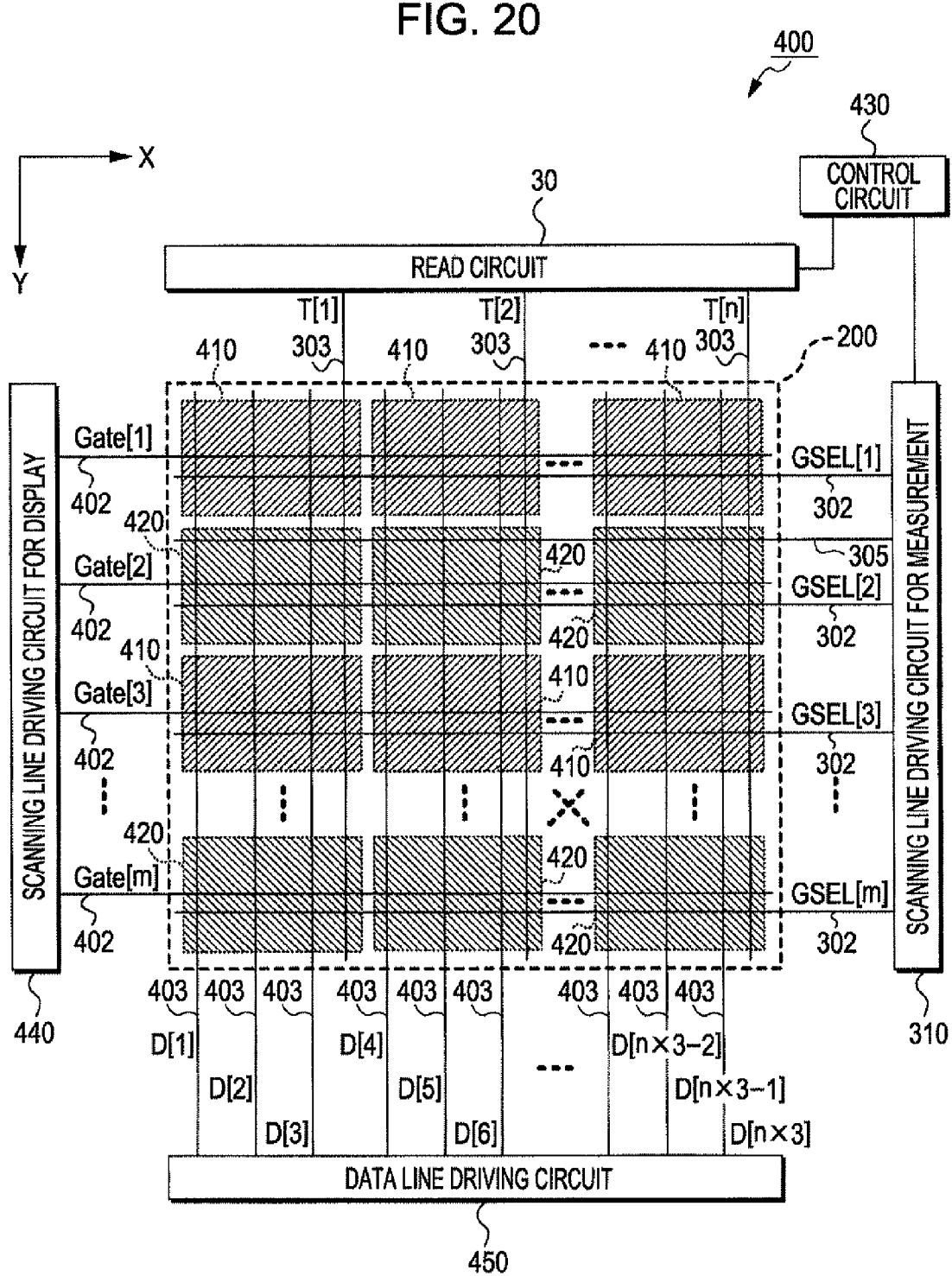
FIG. 20 is a block diagram illustrating the structure of a display device 400 according to a fourth embodiment of the invention.

FIG. 20 is a block diagram illustrating the structure of a display device 400 according to a fourth embodiment of the invention. The display device 400 is a so-called transmissive liquid crystal display device. The display device 400 is greatly different from the sensing circuit 300 in that it includes a display circuit in addition to the sensors. Specifically, the display device 400 includes a display measurement region 401 in which a plurality of unit circuits (a plurality of unit circuits 410 and a plurality of unit circuits 420) are arranged in a matrix instead of the measurement region 301, and a control circuit 430 instead of the control circuit 330. In addition, the display device 400 includes a scanning line driving circuit 440 for display and a data line driving circuit 450 that drive the unit circuits, and a backlight (not shown).

The backlight is provided on the rear side of the display measurement region 401. In the display measurement region 401, a 'rear surface' is opposite to a contact surface. When an outer surface of the first substrate is the contact surface, an outer surface of the second substrate is the rear surface. In addition, in the display device 400, both the first substrate and the second substrate are made of a translucent material, and the dielectric material PM is limited to liquid crystal. The plurality of unit circuits are arranged in a matrix along the first substrate and the second substrate between the first substrate and the second substrate.

As shown in FIG. 20, similar to the measurement region 301, m measuring scanning lines 302 extending in the x direction and n sensing lines 303 extending in the Y direction are provided in the display measurement region 401. Similar to the sensors of the sensing circuit 300, the unit circuits are disposed at positions corresponding to intersections of the measuring scanning lines 302 and the sensing lines 303, and are arranged in a matrix of m rows by n columns. In addition, m display scanning lines 402 extending in the X direction and n×3 data lines 403 extending in the Y direction are provided in the display measurement region 401. The unit circuits are also disposed at positions corresponding to intersections of the display scanning lines 402 and groups of three data lines 403.

The scanning line driving circuit 440 for display repeatedly performs a process of sequentially activating display scanning signals Gate[i] output to the m display scanning lines 402 for each horizontal scanning period (1H) to sequentially select the display scanning lines 402 for each vertical scanning period (1V). The data line driving circuit 450 outputs data signals D[u] (u=1 to n×3) corresponding to pixel circuits 460 (which will be described below) corresponding to the display scanning line 402 selected by the scanning line driving circuit 440 for display to the data lines 403. The data signal D[u] is a potential corresponding to a grayscale level designated to the corresponding pixel circuit 460 (which will be described below).

As described above, in this embodiment, since the relationship 1V=1H×m is established, the scanning line driving circuit 310 for measurement sequentially activates odd-numbered or even-numbered measurement scanning signals GSEL[i] (i=1 to m) output from the m measuring scanning lines 302 for every two horizontal scanning periods (2H) to sequentially select the measuring scanning lines 302. That is, in this embodiment, the scanning line driving circuit 310 for measurement repeatedly performs an optical scanning operation of sequentially selecting m/2 odd-numbered measuring scanning lines 302 for every two horizontal scanning periods (2H) and a capacitance scanning operation of sequentially selecting m/2 even-numbered measuring scanning lines 302 for every two horizontal scanning periods (2H).

The plurality of unit circuits 410 are disposed at positions corresponding to intersections of the odd-numbered measuring scanning lines 302 and the sensing lines 303 (intersections of the odd-numbered display scanning lines 402 and groups of three data lines 403). The plurality of unit circuits 420 are disposed at positions corresponding to intersections of the even-numbered measuring scanning lines 302 and the sensing lines 303 (intersections of the even-numbered display scanning lines 402 and groups of three data lines 403).

Figure 21:
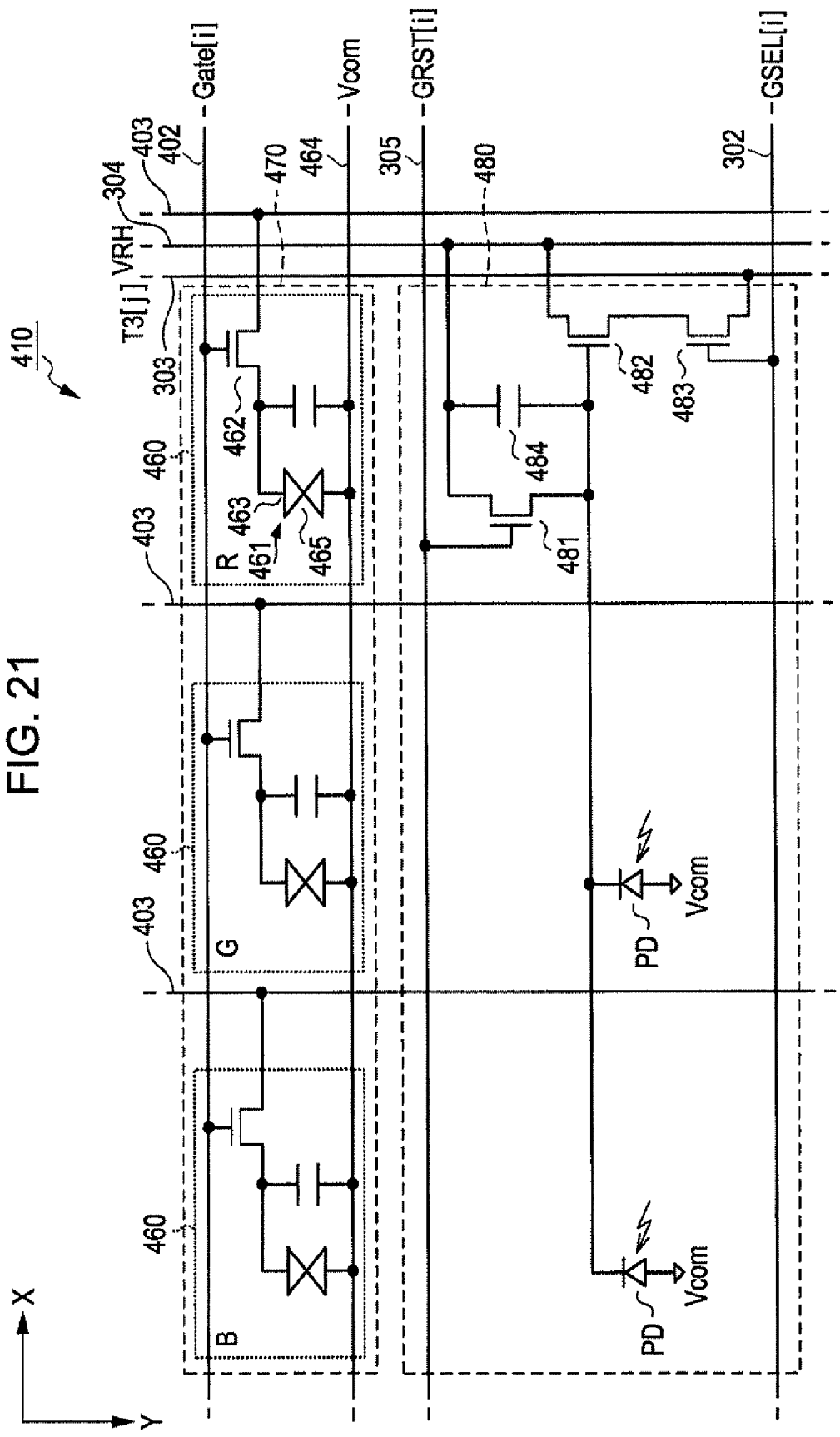
FIG. 21 is a circuit diagram illustrating the structure of a unit circuit 410 of the display device 400.

As shown in FIG. 21, each of the unit circuits 410 includes a display unit circuit 470 and a light sensing circuit 480. The display unit circuit 470 includes a set of pixel circuits 460. One set of pixel circuits 460 includes a red pixel (R pixel) that displays red, a green pixel (G pixel) that displays green, and a blue pixel (B pixel) that displays blue. The set of pixel circuits 460 is arranged in the X direction, and the pixel circuits 460 are disposed at positions corresponding to intersections of the display scanning line 402 and the data lines 403.

Each of the pixel circuits 460 includes a liquid crystal element 461 and a transistor 462. The liquid crystal element 461 includes a pixel electrode 463, a common electrode 464, and liquid crystal 465 to which an electric field generated between the two electrodes is applied. The liquid crystal 465 is a portion of the liquid crystal interposed between the first substrate and the second substrate. This embodiment adopts a lateral electric field type in which the alignment of the liquid crystal 465 is controlled by an electric field generated in the horizontal direction between the pixel electrode 463 and the common electrode 464. However, other electric field types may be used.

A common potential Vcom is supplied to the common electrode 464. The transistor 462 is an N-channel TFT (thin film transistor), and is interposed between the pixel electrode 463 and the data line 403 to control electrical connection therebetween. A gate of the transistor 462 is connected to the display scanning line 402. Therefore, when an i-th display scanning line 402 is selected, the transistors 462 of the pixel circuits 460 in the i-th row are turned on. A data signal D[u] is supplied from the data line 403 to the pixel electrode 463 of a u-th pixel circuit 460 among the pixel circuits 460.

When the potential of the data signal D[u] supplied to the pixel electrode 463 of the pixel circuit 460 in the i-th row and the u-th column is VD, a voltage of VD−Vcom is applied between the pixel electrode 463 and the common electrode 464 of the pixel circuit 460. That is, the light transmittance (the ratio of the amount of light transmitted to an observer side to the amount of light emitted from the backlight to the liquid crystal element 461) of the liquid crystal element 461 in the pixel circuit 460 depends on the potential of the supplied data signal.

The light sensing circuit 480 outputs a light measurement signal (first detection signal) T3[j] having a level corresponding to the amount of light incident on the photodiode PD, which will be described below, to the read circuit 320. In addition, the light sensing circuit 480 has the same structure as the light sensing circuit 340, and includes a reset transistor 481 corresponding to the reset transistor 341, an amplifying transistor 482 corresponding to the amplifying transistor 342, a selecting transistor 483 corresponding to the selecting transistor 343, a reference capacitive element 484 corresponding to the reference capacitive element 344, and the photodiodes PD. However, one light sensing circuit 480 includes two photodiodes PD. Most of light incident on the photodiode PD is emitted from the backlight and then reflected from an object.

One of the two photodiodes PD included in one light sensing circuit 480 is arranged in the vicinity of the G pixel circuit 460, and the other photodiode is arranged in the vicinity of the B pixel circuit 460. The cathodes of the two photodiodes PD are connected to the gate of the amplifying transistor 482. The photodiode PD is not arranged in the vicinity of the R pixel circuit 460 because an element, such as the amplifying transistor 482 or the reference capacitive element 484, is arranged in the vicinity of the R pixel circuit 460.

Figure 22:
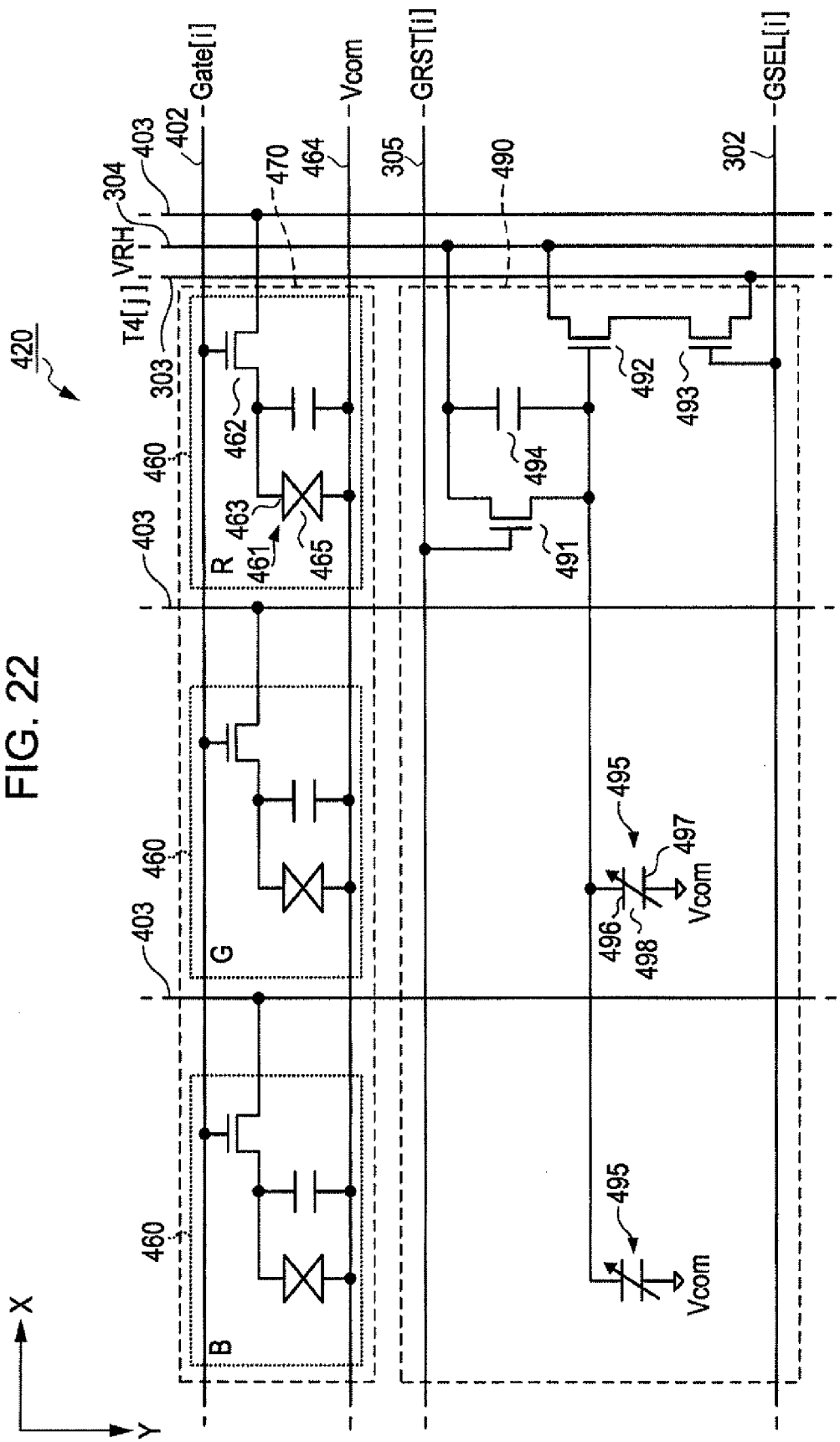
FIG. 22 is a circuit diagram illustrating the structure of a unit circuit 420 of the display device 400.

As shown in FIG. 22, the unit circuit 420 includes a display unit circuit 470 and a capacitance sensing circuit 490. As described above, the display unit circuit 470 includes a set of pixel circuits 460. Therefore, in the display device 400, m×(n×3) pixel circuits 460 are arranged along the first substrate and the second substrate between the first substrate and the second substrate. In addition, as described above, m×n unit circuits are arranged along the first substrate and the second substrate between the first substrate and the second substrate. Therefore, m×n sensors are arranged along the two substrates between the two substrates.

The capacitance sensing circuit 490 outputs a capacitance measurement signal (second detection signal) T4[j] having a level corresponding to the capacitance value of a contact measuring capacitive element 495, which will be described below, to the read circuit 320. In addition, the capacitance sensing circuit 490 has the same structure as the capacitance sensing circuit 350. Therefore, in the display device 400, n light sensing circuits 480 are connected to the odd-numbered measuring scanning lines 302, but the unit circuits 420 are not connected to the odd-numbered measuring scanning lines 302. In addition, n capacitance sensing circuits 490 are connected to the even-numbered measuring scanning lines 302, but the unit circuits 410 are not connected to the even-numbered measuring scanning lines 302. Further, m/2 light sensing circuits 480 and m/2 capacitance sensing circuits 490 in each column are connected to each of the n sensing lines 303.

The capacitance sensing circuit 490 includes a reset transistor 491 corresponding to the reset transistor 352, an amplifying transistor 492 corresponding to the amplifying transistor 353, a selecting transistor 493 corresponding to the selecting transistor 354, a reference capacitive element 494 corresponding to the reference capacitive element 355, and contact measuring capacitive elements 495 corresponding to the contact measuring capacitive element 351. However, one capacitance sensing circuit 490 includes two contact measuring capacitive elements 495.

Each of the contact measuring capacitive elements 495 includes a first electrode 496 corresponding to the first electrode 356, a second electrode 497 corresponding to the second electrode 357, and liquid crystal 498 to which an electric field generated between the two electrodes is applied. The liquid crystal 498 is a portion of the liquid crystal interposed between the first substrate and the second substrate. One of the two contact measuring capacitive elements 495 included in one capacitance sensing circuit 490 is arranged in the vicinity of the G pixel circuit 460, and the other contact measuring capacitive element is arranged in the vicinity of the B pixel circuit 460. The first electrode 496 of each of the two contact measuring capacitive elements 495 is connected to the gate of the amplifying transistor 492 The contact measuring capacitive element 495 is not provided in the vicinity of the R pixel circuit 460 because the photodiode PD is not provided in the vicinity of the R pixel circuit 460 in the light sensing circuit 480.

Figure 23:
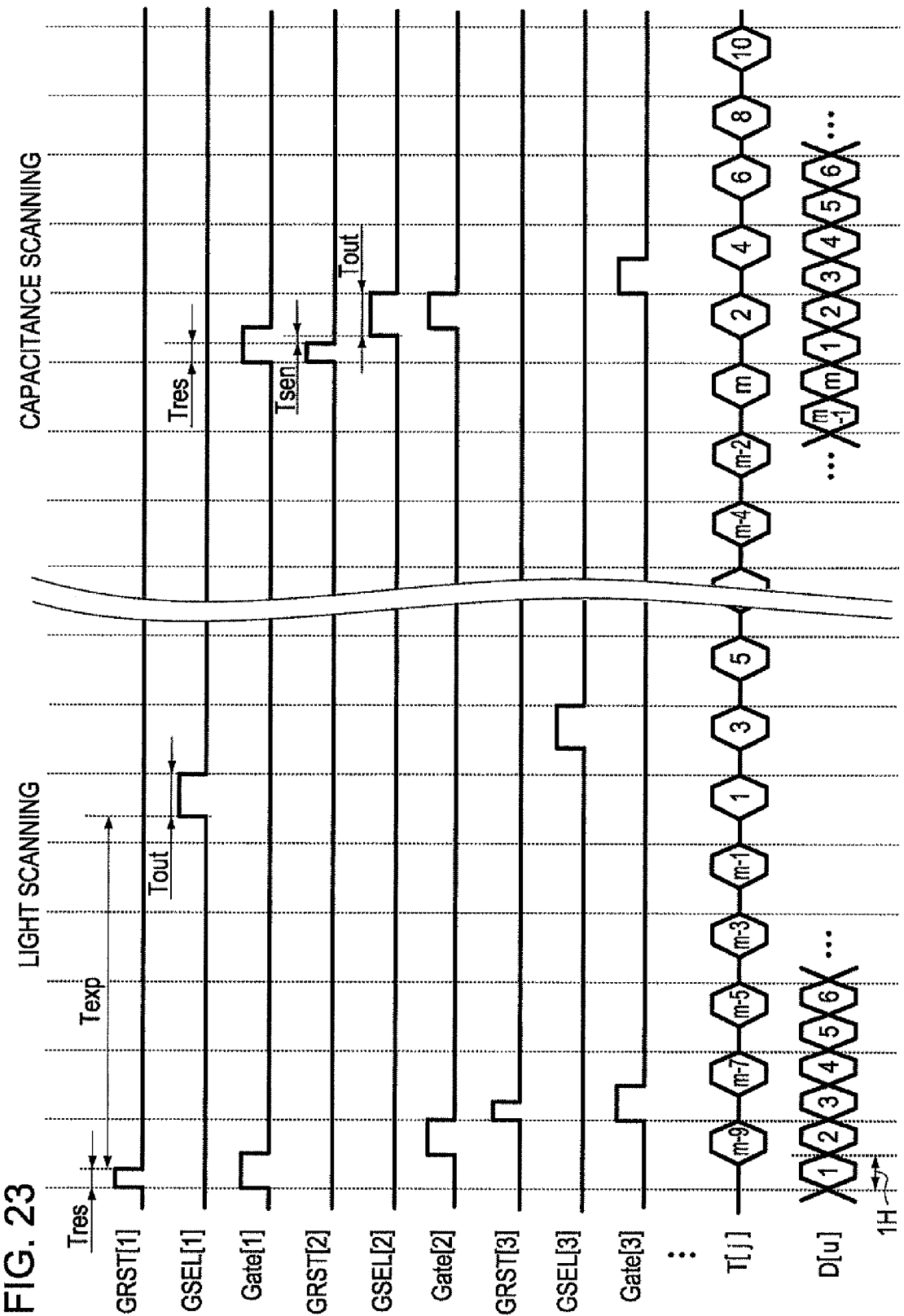
FIG. 23 is a timing chart illustrating the operation of the display device 400.

FIG. 23 is a timing chart illustrating the operation of the display device 400. As shown in FIG. 23, for a certain horizontal scanning period (1H), the display scanning signal Gate [1] supplied from the first display scanning line 402 to n×3 pixel circuits 460 in the first row is changed to an active level, and the transistors 462 of the pixel circuits 460 are turned on. Then, data signals (for example, data signals D[u]) are supplied from the corresponding data lines 403 to the pixel electrodes 463 of the pixel circuits 460 (for example, the pixel circuits 460 in a u-th column), and the light transmittances of the liquid crystal elements 461 of the pixel circuits 460 vary depending on the potentials of the supplied data signals. When the horizontal scanning period (1H) has elapsed, the display scanning signal Gate[1] is changed to an inactive level.

Then, the level of a display scanning signal Gate[i] corresponding to the next (i-th) display scanning line 402 varies in the same way as described above for each horizontal scanning period. When a vertical scanning period (1V) has elapsed, the display scanning signal Gate[m] is changed to an inactive level, and a display process corresponding to one frame ends. For the next horizontal scanning period, the display scanning signal Gate[1] is changed to an active level again, and a display process for the next frame starts.

The optical scanning operation and the capacitance scanning operation are alternately performed for each frame.

In the optical scanning operation, for a horizontal scanning period (1H) for which the display scanning signal Gate[1] is at an active level, a reset signal GRST[1] supplied from the first control line 305 to the light sensing circuits 480 in the first row is changed to an active level, and the light sensing circuits 480 in the first row reach the reset period Tres. Then, for the horizontal scanning period, the reset signal GRST[1] is changed to an inactive level, and the light sensing circuits 480 in the first row reach the exposure period Texp. Then, for the next horizontal scanning period (1H), the current state is maintained. Then, the level of the reset signal GRST[p] corresponding to the next odd-numbered (p-th) control line 305 varies for every two horizontal scanning periods (2H) in the same way as described above.

Then, for the next two horizontal scanning periods (2H), the measurement scanning signal GSEL[1] supplied from the first measuring scanning line 302 to the light sensing circuits 480 in the first row is changed from a low level to a high level, and the light sensing circuits 480 in the first row reach the read period Tout. Then, when the two horizontal scanning periods (2H) end, the measurement scanning signal GSEL[1] is changed to a low level, and the read period Tout ends. During the read period Tout, the levels of the measurement signals T[j] (light measurement signals T3[j]) supplied from the light sensing circuits 480 in the first row to the read circuit 320 through the n sensing line 303 depend on the amount of light incident on the photodiodes PD of the light sensing circuits 480. Then, the level of the reset signal GRST[p] corresponding to the next odd-numbered (p-th) control line 305 varies for every two horizontal scanning periods (2H) in the same way as described above.

In the capacitance scanning operation, for a horizontal scanning period (1H) for which the display scanning signal Gate[1] is at an active level, the reset signal GRST[2] supplied from the second control line 305 to the light sensing circuits 480 in the second row is changed to an active level, and the capacitance sensing circuits 490 in the second row reach the reset period Tres. Then, for the horizontal scanning period, the reset signal GRST[2] is changed to an inactive level, and the capacitance sensing circuits 490 in the second row reach the sensing period Tsen. For two horizontal scanning periods (2H) having the abovementioned horizontal scanning period (1H) at its head, the measurement scanning signal GSEL[2] supplied from the second measuring scanning line 302 to the capacitance sensing circuits 490 in the second row is changed from a low level to a high level, and the capacitance sensing circuits 490 in the second row reach the read period Tout. Then, when the two horizontal scanning periods (2H) end, the measurement scanning signal GSEL[2] is changed to a low level, and the read period Tout ends. During the read period Tout, the levels of the measurement signals T[j] (capacitance measurement signals T4[j]) supplied from the capacitance sensing circuits 490 in the second row to the read circuit 320 through the n sensing lines 303 correspond to the capacitance values of the two contact measuring capacitive elements 495 in each of the capacitance sensing circuits 490.

Then, the level of a reset signal GRST[q] corresponding to the next even-numbered (q-th) control line 305 and the level of a measurement scanning signal GSEL[q] corresponding to the q-th measuring scanning line 302 vary for two horizontal scanning periods (2H) in the same way as described above. The lengths of the exposure period Texp and the sensing period Tsen shown in FIG. 23 are just examples, similar to the third embodiment.

The control circuit 430 performs the same process as the control circuit 330. However, in this embodiment, since most of light incident on the photodiode PD is emitted from the backlight and then reflected from an object, the relationship between the dark portion and the bright portion shown in FIG. 17 exactly shows the actual relationship between the dark portion and the bright portion. The process of the control circuit 430 is determined on the basis of the relationship.

As described above, the display device 400 includes a sensing circuit. The sensing circuit includes the first and second substrates that face each other, the liquid crystal 465 that is interposed between the two substrates, a plurality of measuring scanning lines 302 that extend along the two substrates between the two substrates, and a plurality of capacitance sensing circuits 490 and a plurality of light sensing circuits 480 that are arranged in a matrix along the two substrates between the two substrates. The light sensing circuits 480 in a j-th column are connected to the measuring scanning lines 302 to which the capacitance sensing circuits 490 are not connected, and output the light measurement signals T3[j] having a level corresponding to the amount of incident light. The capacitance sensing circuits 490 in the j-th column are connected to the measuring scanning lines 302 to which the light sensing circuits 480 are not connected, and include the contact measuring capacitive elements 495 each having the liquid crystal 465, the first electrode 496, and the second electrode 497. The capacitance sensing circuits 490 output the capacitance measurement signals T4[j] having levels corresponding to the capacitance values of the contact measuring capacitive elements 495.

Therefore, according to the display device 400, it is possible to accurately specify the contact position between an object and the display device on the basis of the measurement signals. In addition, according to the display device 400, only the light sensing circuits 480 or only the capacitance sensing circuits 490 are selected by one sensor row selecting operations and the sensors selected by one row selecting operation output only the light measurement signal T3 or the capacitance measurement signal T4. Therefore, it is possible to simplify the data processing of a circuit in the next stage.

Further, the display device 400 includes a plurality of sensing lines 303 that extend along the first substrate and the second substrate between the two substrates. The capacitance sensing circuits 490 and the light sensing circuits 480 are connected to the sensing lines 303. That is, in the display device 400, the sensing lines 303 are common to the capacitance sensing circuits 490 and the light sensing circuits 480. Therefore, according to the display device 400, for example, it is possible to improve the aperture ratios of the light sensing circuit 480 and the pixel circuit.

In this embodiment, as described above, interlace scanning is performed. That is, a display capacitance sensing process of driving m×(n×3) pixel circuits 460 and m/2×n capacitance sensing circuits 490 and a display light sensing process of driving m×(n×3) pixel circuits 460 and m/2×n light sensing circuits 480 are alternately performed for each frame. An optical image based on only the light measurement signals T3[j] output from the light sensing circuits 480 and a capacitance image based on only the capacitance measurement signals T4[j] output from the capacitance sensing circuits 490 are obtained for each frame. Therefore, according to this embodiment, it is possible to simplify the data processing of a circuit in the next stage.

In the related art, it is difficult to solve the problem that the output current of the photodiode is significantly smaller than that of the contact measuring capacitive element during a reset operation. In contrast, in this embodiment, since the light sensing circuits and the capacitance sensing circuits are individually provided, the above-mentioned problem does not arise.

Furthermore, the display device 400 can be used as a liquid crystal display device provided with a touch panel. That is, according to this embodiment, since the light sensing circuits 480 and the capacitance sensing circuits 490 as well as the pixel circuits 460 are provided between the first substrate and the second substrate having the liquid crystal therebetween, it is possible to reduce the overall thickness of a display device, as compared to a structure in which a touch panel is provided outside a liquid crystal display panel.

Fifth Embodiment

Figure 24:
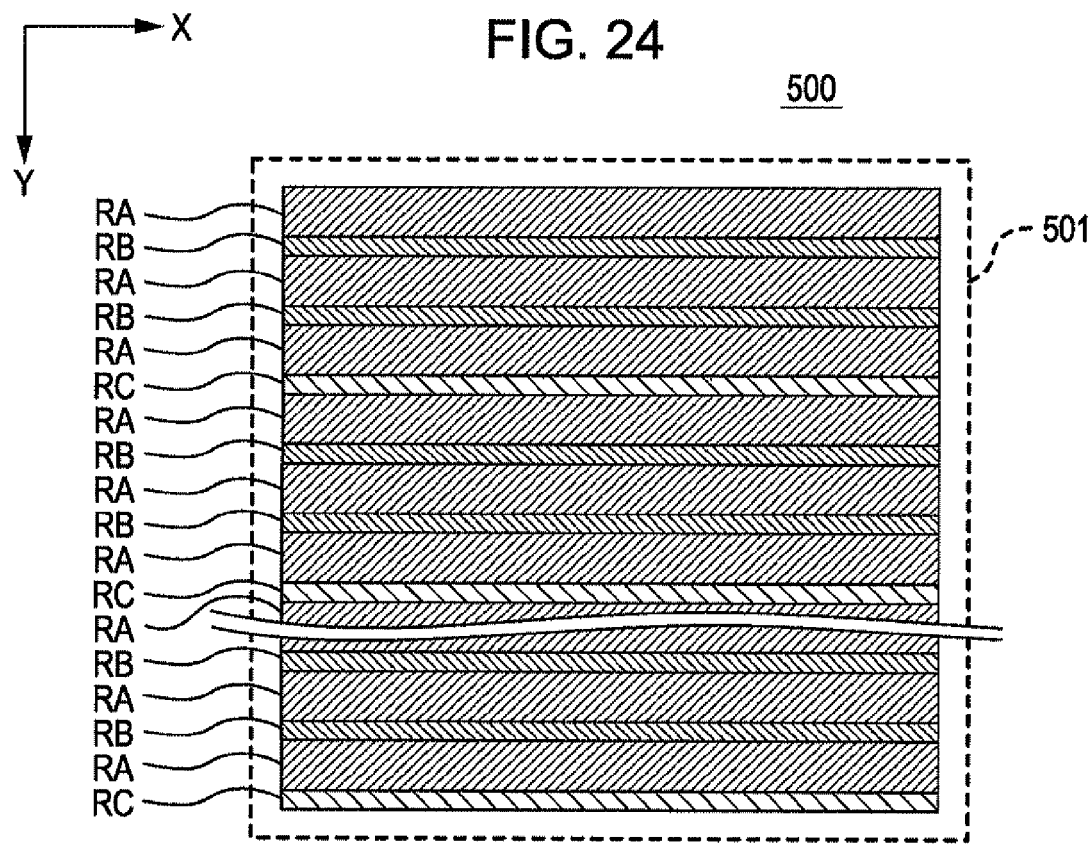
FIG. 24 is a diagram schematically illustrating the characteristics of a display device 500 according to a fifth embodiment of the invention.

FIG. 24 is a diagram schematically illustrating the characteristics of a display device 500 according to a fifth embodiment of the invention. The display device 500 is greatly different from the display device 400 in that it includes a display measurement region 501 instead of the display measurement region 401. When a row of pixel circuits is referred to as a 'display row', a row of light sensing circuits is referred to as a 'light row', a row of capacitance sensing circuits is referred to as a 'capacitance row', and a row of light sensing circuits or capacitance sensing circuits is referred to as a 'sensor row', the display rows and the sensor rows are alternately arranged in the display measurement region 401. However, in this embodiment, a plurality of display rows and the sensor row are alternately arranged in the display measurement region 501. The plurality of display rows are arranged in a display region RA in FIG. 24. In the display measurement region 401, the light rows and the capacitance rows are alternately arranged. However, in the display measurement region 501, the light rows are provided in a ratio of 2:3, and the capacitance rows are provided in a ratio of 1:3. The light row is arranged in an optical region RB in FIG. 24, and the capacitance row is arranged in a capacitance region RC in FIG. 24.

As described above, in general, the capacitance region is larger than the optical region. In the display device 500, similar to the display device 400, both a binarized capacitance image and a binarized optical image are used to detect a contact position. Therefore, when the specification accuracy of the capacitance region is lowered but it is possible to ensure the detection accuracy of contact, the specification accuracy of a final contact position is hardly lowered. When the density of the light rows in the contact surface is increased to increase the number of light sensing circuits, the specification accuracy of the light contact region is improved. As a result, the specification accuracy of the final contact position is improved. For this reason, this embodiment adopts the above-mentioned structure.

In this embodiment, the capacitance rows are arranged at an interval corresponding to the diameter or the minor axis of a contact range of an object in order to ensure the accuracy of detecting the contact of an object. The diameter or the minor axis of the contact range of the object varies depending on objects. For example, when the object is a user's finger, the diameter of the contact range of the object is about 5 mm. In this case, when the pitch between the pixels is 0.1 mm, one capacitance row is arranged for about 50 display rows. Of course, the ratio of one capacitance row to the number of display rows may be reduced.

According to this embodiment, it is possible to obtain the same effects as those of the fourth embodiment. In addition, according to this embodiment, the specification accuracy of a contact position is improved. Further, according to this embodiment, the number of light rows is larger than that of capacitance rows, and the number of light sensing circuits is larger than that of capacitance sensing circuits. Therefore, it is possible to improve the resolution of the specification of a contact position, as compared to other structures. In addition, it is preferable that the number of stages of a shift register for capacitance be smaller than that of a shift register for light. For example, there is provided a method of specifying a contact position in a sensing circuit including a plurality of capacitance sensing circuits each of which measures a variation in capacitance and outputs a capacitance measurement signal and a plurality of light sensing circuits each of which measures the amount of incident light and outputs a light measurement signal. The method includes: a first step of sequentially scanning the plurality of capacitance sensing circuits to acquire the capacitance measurement signals; a second step of determining whether an object contacts a contact surface on the basis of the acquired capacitance measurement signals; a third step of sequentially scanning the plurality of light sensing circuits to acquire light measurement signals after it is determined in the second step that the object contacts the contact surface; and a fourth step of specifying the contact position of the object with the contact surface on the basis of the acquired light measurement signals. The first step and the second step are repeatedly performed until it is determined in the second step that the object contacts the contact surface. In this case, when the number of stages of the shift register for capacitance is smaller than that of the shift register for light, it is possible to reduce power consumption of an electronic apparatus (for example, a display device) provided with the sensing circuit when the first step of controlling the shift register for capacitance to acquire the capacitance measurement signal and the second step of determining whether an object contacts the contact surface are repeatedly performed.

In this embodiment, the scanning line driving circuit 310 for measurement, the read circuit 320, and the control circuit 430 of the display device 400 are modified and used. Modifications that are not apparent from the above description may be appropriately made. For example, the control circuit 430 may perform interpolation to make the resolution of a capacitance image equal to the resolution of an optical image, binarize the capacitance image and the optical image, and combine the binarized images.

Modifications

The invention is not limited to the above-described embodiments. For example, the following modifications can be made. In addition, among the following modifications, two or more modifications can be combined with each other.

As a modification of the third embodiment, a backlight may be provided on the rear side of the measurement region 301, and the light sensing circuit 340 may mainly measure the amount of light that is emitted from the backlight, is reflected from an object, and is incident on the photodiode PD. In this structure, similar to the fourth embodiment, both the first substrate and the second substrate need to be made of a translucent material, such as glass.

As modifications of the third and fourth embodiments, a plurality of measuring scanning lines 302 may extend along one of the first substrate and the second substrate, and a plurality of sensors (unit circuits) may be arranged along one of the two substrates. Similarly, n sensing lines 303 may extend along one of the two substrates.

In the fourth embodiment, the photodiode PD or the contact measuring capacitive element 495 is not provided in the vicinity of the R pixel circuit 460, but the invention is not limited thereto. For example, an element, such as the amplifying transistor 482 or the reference capacitive element 484, may be disposed at a different position, and the photodiode PD or the contact measuring capacitive element 495 may be provided in the vicinity of the R pixel circuit 460. In addition, one light sensing circuit (or one capacitance sensing circuit) may include one photodiode PD (or the contact measuring capacitive element 495). One light sensing circuit (or one capacitance sensing circuit) may include three or more photodiodes PD (or the contact measuring capacitive elements 495).

In the fourth embodiment, one sensor is arranged for a set of the R pixel circuit 460, the G pixel circuit 460, and the B pixel circuit 460, but the invention is not limited thereto. For example, one sensor may be arranged for each pixel (dot), or one sensor may be arranged for a set of four or more pixels. In addition, the invention may be applied to a monochrome display device. Furthermore, as a modification of the fourth embodiment, the invention may be applied to a so-called reflective liquid crystal display device.

In the fourth and fifth embodiments, the start time of the reset period Tres is the same as that of one horizontal scanning period (1H), but the invention is not limited thereto. The start time of the reset period Tres may be different from that of one horizontal scanning period (1H). In this case, it is possible to suppress the peak of the current consumed by a display device.

As a modification of the fifth embodiment, the ratio of the light rows and the capacitance rows may be different from the above-mentioned ratio. It is preferable that the ratio of the light rows be greater than that of the capacitance rows, that is, the number of light sensing circuits be greater than the number of capacitance sensing circuits. In addition, as a modification of the fifth embodiment, the ratio of the display rows and the sensor rows may be different from the above-mentioned ratio. For example, similar to the third and fourth embodiments, the display rows and the sensor rows may be alternately arranged.

Applications

Figure 25:
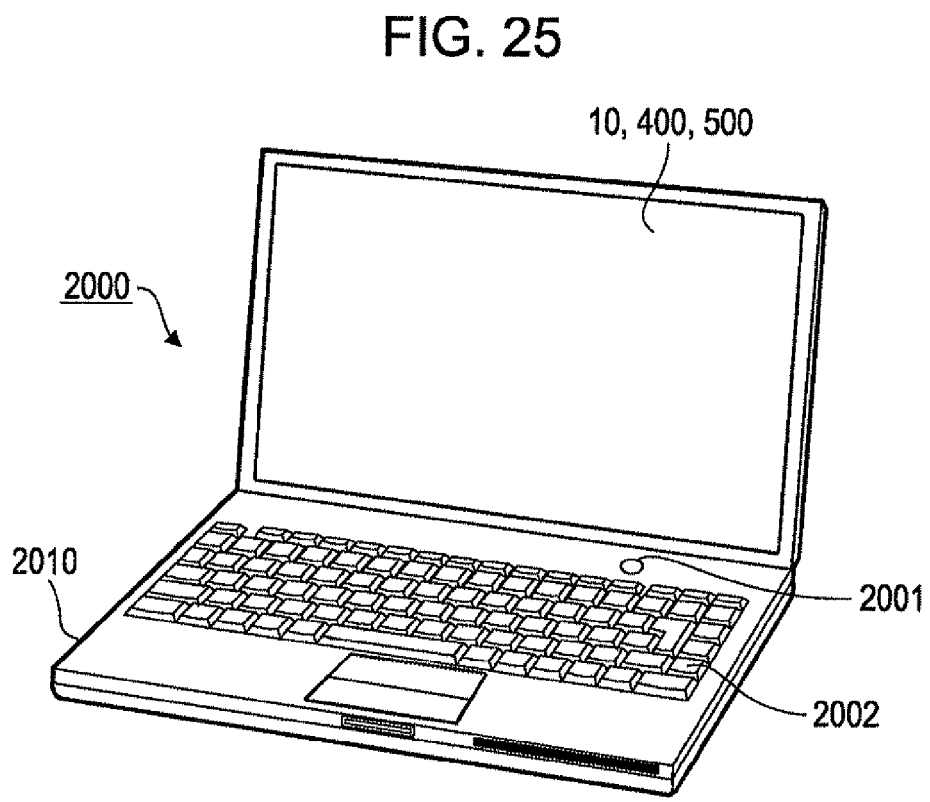
FIG. 25 is a perspective view illustrating a detailed example (mobile personal computer) of an electronic apparatus according to the invention.

Next, electronic apparatuses to which the display devices according to the above-described embodiments of the invention are applied will be described. FIG. 25 is a perspective view illustrating the structure of a mobile personal computer provided with the display device according to any one of the above-described embodiments. A personal computer 2000 includes the display device 10, 400, or 500 and a main body 2010. The main body 2010 is provided with a power supply switch 2001 and a keyboard 2002.

Figure 26:
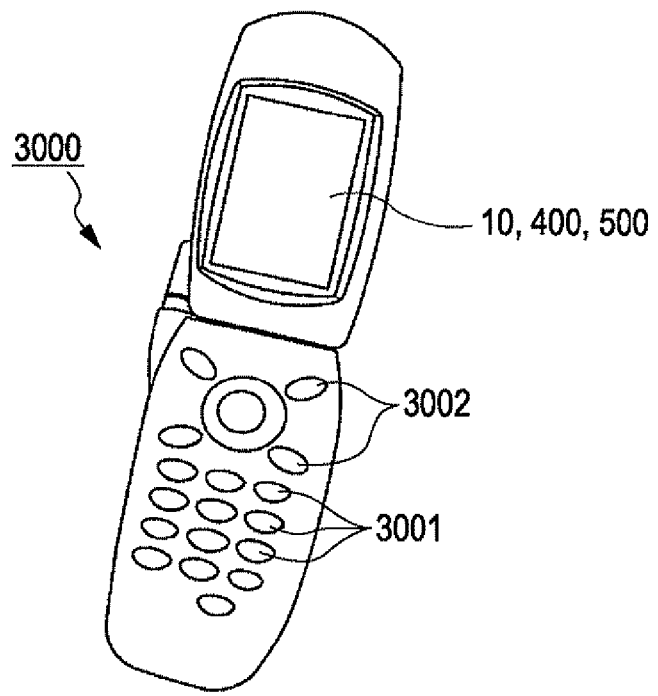
FIG. 26 is a perspective view illustrating a detailed example (mobile phone) of an electronic apparatus according to the invention.

FIG. 26 is a diagram illustrating the structure of a mobile telephone provided with the display device according to any one of the above-described embodiments. A mobile telephone 3000 includes a plurality of operating buttons 3001 and scroll buttons 3002, and the display device 10, 400, or 500. A user operates the scroll buttons 3002 to scroll a screen displayed on the display device 10, 400, or 500.

Figure 27:
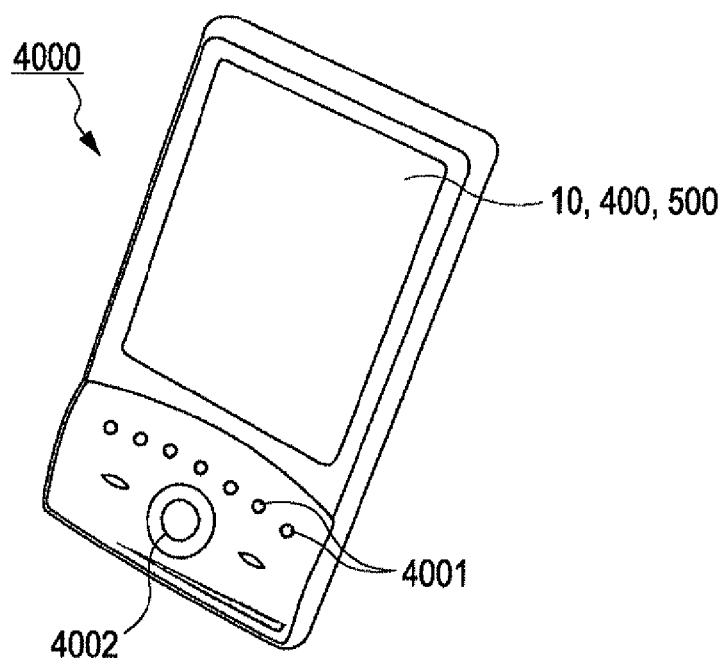
FIG. 27 is a perspective view illustrating a detailed example (personal digital assistant) of an electronic apparatus according to the invention.

FIG. 27 is a diagram illustrating the structure of a personal digital assistant (PDA) provided with the display device according to any one of the above-described embodiments. A personal digital assistant 4000 includes a plurality of operating buttons 4001, a power supply switch 4002, and the display device 10, 400, or 500. When the user operates the power supply switch 4002, various information items, such as an address book and a schedule, are displayed on the display device 10, 400, or 500.

In addition, examples of the electronic apparatuses to which the display device and the sensing circuit according to the above-described embodiments of the invention include a digital still camera, a television set, a video camera, a car navigation apparatus, a pager, an electronic organizer, an electronic paper, an electronic calculator, a word processor, a workstation, a videophone, a POS terminal, a printer, a scanner, a copying machine, a video player, and apparatuses equipped with touch panels, in addition to the electronic apparatuses shown in FIGS. 25 to 27. In addition, the use of the display device according to the above-described embodiments of the invention is not limited to the display of an image. For example, a writing head is used to expose a photoconductor according to an image to be formed on a recording medium, such as a sheet, in an image forming apparatus, such as an optical writing printer or an electronic copying machine. The display device according to the above-described embodiments of the invention can be applied to this type of writing head. In addition, the sensing circuit according to the above-described embodiments of the invention can be applied to devices other than the display device.

This application claims priority to Japanese Application No. 2008-120235 filed in Japan on May 2, 2008 and to Japanese Application No. 2008-129070 filed in Japan on May 16, 2008, the entire disclosures of which are hereby incorporated by reference in their entirety.

That is claimed is:

1. A display device comprising:
a first substrate and a second substrate that face each other;
electro-optical elements that are interposed between the first substrate and the second substrate;
light detecting units that are provided between the first substrate and the second substrate and output first detection signals having levels corresponding to the amount of incident light; and
capacitance detecting units that include capacitive elements each having a first electrode and a second electrode provided between the first substrate and the second substrate, output second detection signals having levels corresponding to the capacitance values of the capacitive elements, and are provided separately from the light detecting units.

2. The display device according to claim 1,
wherein each of the capacitive elements includes the first electrode provided on a surface of the first substrate facing the second substrate, the second electrode provided on a surface of the second substrate facing the first substrate, and an electro-optical material interposed between the first electrode and the second electrode, and
each of the second electrodes is provided on the surface of the second substrate facing the first substrate so as to cover a first protruding portion that protrudes toward the first substrate.

3. The display device according to claim 2, further comprising:
spacers each of which includes a second protruding portion that is provided at a different position from the light detecting unit and the capacitance detecting unit on the surface of the first substrate facing the second substrate and protrudes toward the second substrate and a third protruding portion that is provided at a position facing the second protruding portion on the surface of the second substrate facing the first substrate and protrudes toward the first substrate,
wherein the second protruding portion and the third protruding portion come into contact with each other to form the spacer, and
the first protruding portion and the third protruding portion have the same height.

4. The display device according to claim 3,
wherein the light detecting unit includes a light detecting element that is provided on the surface of the first substrate facing the second substrate, and
the second protruding portion includes a second light detecting element having the same structure as the light detecting element.

5. The display device according to claim 2, further comprising:
second spacers,
wherein the light detecting unit includes a light detecting element that is provided on the surface of the first substrate facing the second substrate,
each of the second spacers includes the light detecting element and a fourth protruding portion that is provided at a position facing the light detecting element on the surface of the second substrate facing the first substrate so as to protrude toward the first substrate,
the light detecting element and the fourth protruding portion come into contact with each other to form the second spacer, and
the fourth protruding portion and the first protruding portion have the same height.

6. The display device according to claim 5,
wherein the fourth protruding portion is made of a translucent material.

7. The display device according to claim 1,
wherein the first electrodes and the second electrodes are provided on the first substrate,
each of the capacitive elements includes the first electrode, the second electrode, and an electro-optical material provided between the first and second electrodes and the second substrate, and
first protruding portions that protrude toward the first substrate are provided on a surface of the second substrate facing the first substrate such that each of the first protruding portions faces at least a portion of the first electrode and the second electrode.

8. The display device according to claim 1, further comprising:
a detecting circuit that detects contact between an object and the display device on the basis of the first detection signal and the second detection signal.

9. An electronic apparatus comprising the display device according to claim 1.

10. A sensing circuit comprising:
a first substrate and a second substrate that face each other;
a dielectric material that is interposed between the first substrate and the second substrate;
a plurality of scanning lines that extend along the first substrate or the second substrate between the first substrate and the second substrate; and
a plurality of capacitance sensing circuits and a plurality of light sensing circuits that are arranged in a matrix along the first substrate or the second substrate between the first substrate and the second substrate,
wherein the light sensing circuits are connected to the scanning lines to which the plurality of capacitance sensing circuits are not connected, and output light measurement signals having levels corresponding to the amount of incident light, and
the capacitance sensing circuits are connected to the scanning lines to which the plurality of light sensing circuits are not connected, include capacitive elements each having the dielectric material, a first electrode, and a second electrode, and output capacitance measurement signals having levels corresponding to the capacitance values of the capacitive elements.

11. The sensing circuit according to claim 10, further comprising:
a plurality of sensing lines that extend along the first substrate or the second substrate between the first substrate and the second substrate,
wherein the capacitance sensing circuits and the light sensing circuits are connected to the sensing lines.

12. The sensing circuit according to claim 10,
wherein the number of light sensing circuits is larger than that of capacitance sensing circuits.

13. The sensing circuit according to claim 10, further comprising:
   a shift register for light to which the scanning lines connected to the plurality of light sensing circuits are connected; and
   a shift register for capacitance to which the scanning lines connected to the plurality of capacitance sensing circuits are connected,
   wherein the number of stages of the shift register for capacitance is smaller than that of the shift register for light.

14. A display device comprising:
   the sensing circuit according to claim 10; and
   a plurality of pixel circuits that are arranged in a matrix along the first substrate or the second substrate between the first substrate and the second substrate,
   wherein each of the pixel circuits includes the dielectric material, and
   the dielectric material is liquid crystal.

15. A method of driving the display device according to claim 14, comprising:
   driving the plurality of pixel circuits and the plurality of capacitance sensing circuits;
   driving the plurality of pixel circuits and the plurality of light sensing circuits; and
   alternately performing the driving of the pixel circuits and the capacitance sensing circuits and the driving of the pixel circuits and the light sensing circuits.

16. A method of driving the sensing circuit according to claim 10, comprising:
   driving the plurality of capacitance sensing circuits;
   driving the plurality of light sensing circuits; and
   alternately performing the driving of the capacitance sensing circuits and the driving of the light sensing circuits.

17. An electronic apparatus comprising the sensing circuit according to claim 10.

* * * * *